United States Patent
Hayashi et al.

(10) Patent No.: US 8,751,179 B2
(45) Date of Patent: Jun. 10, 2014

(54) COMPUTER-READABLE STORAGE MEDIUM HAVING STORED INFORMATION PROCESSING PROGRAM THEREON, AND INFORMATION PROCESSING APPARATUS

(75) Inventors: Yugo Hayashi, Kyoto (JP); Kenji Matsutani, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1238 days.

(21) Appl. No.: 12/621,838

(22) Filed: Nov. 19, 2009

(65) Prior Publication Data
US 2011/0077088 A1    Mar. 31, 2011

(30) Foreign Application Priority Data
Sep. 29, 2009   (JP) ................. 2009-225312

(51) Int. Cl.
*G01D 18/00*   (2006.01)
(52) U.S. Cl.
USPC .......................................................... 702/94
(58) Field of Classification Search
USPC .................. 702/150, 152, 153, 155, 169, 193
See application file for complete search history.

(56) References Cited

U.S. PATENT DOCUMENTS

| | | |
|---|---|---|
| 588,172 A | 8/1897 | Peters |
| 688,076 A | 12/1901 | Ensign |
| D188,376 S | 7/1960 | Hotkins et al. |
| 3,184,962 A | 5/1965 | Gay |
| 3,217,536 A | 11/1965 | Motsinger et al. |
| 3,424,005 A | 1/1969 | Brown |
| 3,428,312 A | 2/1969 | Machen |
| 3,712,294 A | 1/1973 | Muller |
| 3,752,144 A | 8/1973 | Weigle, Jr. |
| 3,780,817 A | 12/1973 | Videon |
| 3,826,145 A | 7/1974 | McFarland |
| 3,869,007 A | 3/1975 | Haggstrom et al. |
| 4,058,178 A | 11/1977 | Shinohara et al. |
| 4,104,119 A | 8/1978 | Schilling |
| 4,136,682 A | 1/1979 | Pedotti |
| 4,246,783 A | 1/1981 | Steven et al. |
| 4,296,931 A | 10/1981 | Yokoi |
| 4,337,050 A | 6/1982 | Engalitcheff, Jr. |
| 4,404,854 A | 9/1983 | Krempl et al. |

(Continued)

FOREIGN PATENT DOCUMENTS

| | | |
|---|---|---|
| DE | 40 04 554 | 8/1991 |
| DE | 195 02 918 | 8/1996 |

(Continued)

OTHER PUBLICATIONS

Interface, Inc.—Advanced Force Measurement—SM Calibration Certificate Installation Information, 1984.

(Continued)

*Primary Examiner* — Mohamed Charioui
(74) *Attorney, Agent, or Firm* — Nixon & Vanderhye, P.C.

(57) ABSTRACT

A CPU of a game apparatus sequentially obtains, from a gravity center position detection device, gravity center position data indicative of the gravity center position of a user, and detects a variation range of the gravity center position of the user during a predetermined period to the current time, based on previously obtained gravity center position data. In addition, the CPU executes a predetermined information process based on a relative position of a gravity center position, indicated by a latest gravity center position data, with respect to the variation range detected thus.

19 Claims, 18 Drawing Sheets

(56) References Cited

U.S. PATENT DOCUMENTS

| | | |
|---|---|---|
| 4,488,017 A | 12/1984 | Lee |
| 4,494,754 A | 1/1985 | Wagner, Jr. |
| 4,558,757 A | 12/1985 | Mori et al. |
| 4,569,519 A | 2/1986 | Mattox et al. |
| 4,574,899 A | 3/1986 | Griffin |
| 4,577,868 A | 3/1986 | Kiyonaga |
| 4,598,717 A | 7/1986 | Pedotti |
| 4,607,841 A | 8/1986 | Gala |
| 4,630,817 A | 12/1986 | Buckleu |
| 4,660,828 A | 4/1987 | Weiss |
| 4,680,577 A | 7/1987 | Straayer et al. |
| 4,688,444 A | 8/1987 | Nordstrom |
| 4,691,694 A | 9/1987 | Boyd et al. |
| 4,711,447 A | 12/1987 | Mansfield |
| 4,726,435 A | 2/1988 | Kitagawa et al. |
| 4,739,848 A | 4/1988 | Tulloch |
| 4,742,832 A | 5/1988 | Kauffmann et al. |
| 4,742,932 A | 5/1988 | Pedragosa |
| 4,800,973 A | 1/1989 | Angel |
| 4,838,173 A | 6/1989 | Schroeder et al. |
| 4,855,704 A | 8/1989 | Betz |
| 4,880,069 A | 11/1989 | Bradley |
| 4,882,677 A | 11/1989 | Curran |
| 4,893,514 A | 1/1990 | Gronert et al. |
| 4,907,797 A | 3/1990 | Gezari et al. |
| 4,927,138 A | 5/1990 | Ferrari |
| 4,970,486 A | 11/1990 | Gray et al. |
| 4,982,613 A | 1/1991 | Becker |
| D318,073 S | 7/1991 | Jang |
| 5,044,956 A | 9/1991 | Behensky et al. |
| 5,049,079 A | 9/1991 | Furtado et al. |
| 5,052,406 A | 10/1991 | Nashner |
| 5,054,771 A | 10/1991 | Mansfield |
| 5,065,631 A | 11/1991 | Ashpitel et al. |
| 5,089,960 A | 2/1992 | Sweeney, Jr. |
| 5,103,207 A | 4/1992 | Kerr et al. |
| 5,104,119 A | 4/1992 | Lynch |
| 5,116,296 A | 5/1992 | Watkins et al. |
| 5,118,112 A | 6/1992 | Bregman et al. |
| 5,151,071 A | 9/1992 | Jain et al. |
| 5,195,746 A | 3/1993 | Boyd et al. |
| 5,197,003 A | 3/1993 | Moncrief et al. |
| 5,199,875 A | 4/1993 | Trumbull |
| 5,203,563 A | 4/1993 | Loper, III |
| 5,207,426 A | 5/1993 | Inoue et al. |
| 5,259,252 A | 11/1993 | Kruse et al. |
| 5,269,318 A | 12/1993 | Nashner |
| 5,299,810 A | 4/1994 | Pierce et al. |
| 5,303,715 A | 4/1994 | Nashner et al. |
| 5,360,383 A | 11/1994 | Boren |
| 5,362,298 A | 11/1994 | Brown et al. |
| 5,368,546 A | 11/1994 | Stark et al. |
| 5,405,152 A | 4/1995 | Katanics et al. |
| 5,431,569 A | 7/1995 | Simpkins et al. |
| 5,462,503 A | 10/1995 | Benjamin et al. |
| 5,466,200 A | 11/1995 | Ulrich et al. |
| 5,469,740 A | 11/1995 | French et al. |
| 5,474,087 A | 12/1995 | Nashner |
| 5,476,103 A | 12/1995 | Nahsner |
| 5,507,708 A | 4/1996 | Ma |
| 5,541,621 A | 7/1996 | Nmngani |
| 5,541,622 A | 7/1996 | Engle et al. |
| 5,547,439 A | 8/1996 | Rawls et al. |
| 5,551,445 A | 9/1996 | Nashner |
| 5,551,693 A | 9/1996 | Goto et al. |
| 5,577,981 A | 11/1996 | Jarvik |
| D376,826 S | 12/1996 | Ashida |
| 5,584,700 A | 12/1996 | Feldman et al. |
| 5,584,779 A | 12/1996 | Knecht et al. |
| 5,591,104 A | 1/1997 | Andrus et al. |
| 5,613,690 A | 3/1997 | McShane et al. |
| 5,623,944 A | 4/1997 | Nashner |
| 5,627,327 A | 5/1997 | Zanakis |
| D384,115 S | 9/1997 | Wilkinson et al. |
| 5,669,773 A | 9/1997 | Gluck |
| 5,689,285 A | 11/1997 | Asher |
| 5,690,582 A | 11/1997 | Ulrich et al. |
| 5,697,791 A | 12/1997 | Nashner et al. |
| 5,713,794 A | 2/1998 | Shimojima et al. |
| 5,721,566 A | 2/1998 | Rosenberg et al. |
| 5,746,684 A | 5/1998 | Jordan |
| 5,785,630 A | 7/1998 | Bobick et al. |
| D397,164 S | 8/1998 | Goto |
| 5,788,618 A | 8/1998 | Joutras |
| 5,792,031 A | 8/1998 | Alton |
| 5,800,314 A | 9/1998 | Sakakibara et al. |
| 5,805,138 A | 9/1998 | Brawne et al. |
| 5,813,958 A | 9/1998 | Tomita |
| 5,814,740 A | 9/1998 | Cook et al. |
| 5,820,462 A | 10/1998 | Yokoi et al. |
| 5,825,308 A | 10/1998 | Rosenberg |
| 5,837,952 A | 11/1998 | Oshiro et al. |
| D402,317 S | 12/1998 | Goto |
| 5,846,086 A | 12/1998 | Bizzi et al. |
| 5,853,326 A | 12/1998 | Goto et al. |
| 5,854,622 A | 12/1998 | Brannon |
| 5,860,861 A | 1/1999 | Lipps et al. |
| 5,864,333 A | 1/1999 | O'Heir |
| 5,872,438 A | 2/1999 | Roston |
| 5,886,302 A | 3/1999 | Germanton et al. |
| 5,888,172 A | 3/1999 | Andrus et al. |
| 5,889,507 A | 3/1999 | Engle et al. |
| D407,758 S | 4/1999 | Isetani et al. |
| 5,890,995 A | 4/1999 | Bobick et al. |
| 5,897,457 A | 4/1999 | Mackovjak |
| 5,897,469 A | 4/1999 | Yalch |
| 5,901,612 A | 5/1999 | Letovsky |
| 5,902,214 A | 5/1999 | Makikawa et al. |
| 5,904,639 A | 5/1999 | Smyser et al. |
| D411,258 S | 6/1999 | Isetani et al. |
| 5,912,659 A | 6/1999 | Rutledge et al. |
| 5,919,092 A | 7/1999 | Yokoi et al. |
| 5,921,780 A | 7/1999 | Myers |
| 5,921,899 A | 7/1999 | Rose |
| 5,929,782 A | 7/1999 | Stark et al. |
| 5,947,824 A | 9/1999 | Minami et al. |
| 5,976,063 A | 11/1999 | Joutras et al. |
| 5,980,256 A | 11/1999 | Carmein |
| 5,980,429 A | 11/1999 | Nashner |
| 5,984,785 A | 11/1999 | Takeda et al. |
| 5,987,982 A | 11/1999 | Wenman et al. |
| 5,989,157 A | 11/1999 | Walton |
| 5,993,356 A | 11/1999 | Houston et al. |
| 5,997,439 A | 12/1999 | Ohsuga et al. |
| 6,001,015 A | 12/1999 | Nishiumi et al. |
| 6,007,428 A | 12/1999 | Nishiumi et al. |
| 6,010,465 A | 1/2000 | Nashner |
| D421,070 S | 2/2000 | Jang et al. |
| 6,037,927 A | 3/2000 | Rosenberg |
| 6,038,488 A | 3/2000 | Barnes et al. |
| 6,044,772 A | 4/2000 | Gaudette et al. |
| 6,063,046 A | 5/2000 | Allum |
| 6,086,518 A | 7/2000 | MacCready, Jr. |
| 6,102,803 A | 8/2000 | Takeda et al. |
| 6,102,832 A | 8/2000 | Tani |
| D431,051 S | 9/2000 | Goto |
| 6,113,237 A | 9/2000 | Ober et al. |
| 6,147,674 A | 11/2000 | Rosenberg et al. |
| 6,152,564 A | 11/2000 | Ober et al. |
| D434,769 S | 12/2000 | Goto |
| D434,770 S | 12/2000 | Goto |
| 6,155,926 A | 12/2000 | Miyamoto et al. |
| 6,162,189 A | 12/2000 | Girone et al. |
| 6,167,299 A | 12/2000 | Galchenkov et al. |
| 6,190,287 B1 | 2/2001 | Nashner |
| 6,200,253 B1 | 3/2001 | Nishiumi et al. |
| 6,203,432 B1 | 3/2001 | Roberts et al. |
| 6,216,542 B1 | 4/2001 | Stockli et al. |
| 6,216,547 B1 | 4/2001 | Lehtovaara |
| 6,220,865 B1 | 4/2001 | Macri et al. |
| D441,369 S | 5/2001 | Goto |
| 6,225,977 B1 | 5/2001 | Li |
| 6,227,968 B1 | 5/2001 | Suzuki et al. |
| 6,228,000 B1 | 5/2001 | Jones |

(56) References Cited

U.S. PATENT DOCUMENTS

| | | |
|---|---|---|
| 6,231,444 B1 | 5/2001 | Goto |
| 6,239,806 B1 | 5/2001 | Nishiumi et al. |
| 6,241,611 B1 | 6/2001 | Takeda et al. |
| 6,244,987 B1 | 6/2001 | Ohsuga et al. |
| D444,469 S | 7/2001 | Goto |
| 6,264,558 B1 | 7/2001 | Nishiumi et al. |
| 6,280,361 B1 | 8/2001 | Harvey et al. |
| D447,968 S | 9/2001 | Pagnacco et al. |
| 6,295,878 B1 | 10/2001 | Berme |
| 6,296,595 B1 | 10/2001 | Stark et al. |
| 6,325,718 B1 | 12/2001 | Nishiumi et al. |
| 6,330,837 B1 | 12/2001 | Charles et al. |
| 6,336,891 B1 | 1/2002 | Fedrigon et al. |
| 6,353,427 B1 | 3/2002 | Rosenberg |
| 6,354,155 B1 | 3/2002 | Berme |
| 6,357,827 B1 | 3/2002 | Brightbill et al. |
| 6,359,613 B1 | 3/2002 | Poole |
| D456,410 S | 4/2002 | Ashida |
| D456,854 S | 5/2002 | Ashida |
| D457,570 S | 5/2002 | Brinson |
| 6,387,061 B1 | 5/2002 | Nitto |
| 6,388,655 B1 | 5/2002 | Leung |
| 6,389,883 B1 | 5/2002 | Berme et al. |
| 6,394,905 B1 | 5/2002 | Takeda et al. |
| 6,402,635 B1 | 6/2002 | Nesbit et al. |
| D459,727 S | 7/2002 | Ashida |
| D460,506 S | 7/2002 | Tamminga et al. |
| 6,421,056 B1 | 7/2002 | Nishiumi et al. |
| 6,436,058 B1 | 8/2002 | Krahner et al. |
| D462,683 S | 9/2002 | Ashida |
| 6,454,679 B1 | 9/2002 | Radow |
| 6,461,297 B1 | 10/2002 | Pagnacco et al. |
| 6,470,302 B1 | 10/2002 | Cunningham et al. |
| 6,482,010 B1 | 11/2002 | Marcus et al. |
| 6,510,749 B1 | 1/2003 | Pagnacco et al. |
| 6,514,145 B1 | 2/2003 | Kawabata et al. |
| 6,515,593 B1 | 2/2003 | Stark et al. |
| 6,516,221 B1 | 2/2003 | Hirouchi et al. |
| D471,594 S | 3/2003 | Nojo |
| 6,543,769 B1 | 4/2003 | Podoloff et al. |
| 6,563,059 B2 | 5/2003 | Lee |
| 6,568,334 B1 | 5/2003 | Gaudette et al. |
| 6,616,579 B1 | 9/2003 | Reinbold et al. |
| 6,624,802 B1 | 9/2003 | Klein et al. |
| 6,632,158 B1 | 10/2003 | Nashner |
| 6,636,161 B2 | 10/2003 | Rosenberg |
| 6,636,197 B1 | 10/2003 | Goldenberg et al. |
| 6,638,175 B2 | 10/2003 | Lee et al. |
| 6,663,058 B1 | 12/2003 | Peterson et al. |
| 6,676,520 B2 | 1/2004 | Nishiumi et al. |
| 6,676,569 B1 | 1/2004 | Radow |
| 6,679,776 B1 | 1/2004 | Nishiumi et al. |
| 6,697,049 B2 | 2/2004 | Lu |
| 6,719,667 B2 | 4/2004 | Wong et al. |
| 6,726,566 B2 | 4/2004 | Komata |
| 6,764,429 B1 | 7/2004 | Michalow |
| 6,797,894 B2 | 9/2004 | Montagnino et al. |
| 6,811,489 B1 | 11/2004 | Shimizu et al. |
| 6,813,966 B2 | 11/2004 | Dukart |
| 6,817,973 B2 | 11/2004 | Merril et al. |
| D500,100 S | 12/2004 | Van Der Meer |
| 6,846,270 B1 | 1/2005 | Etnyre |
| 6,859,198 B2 | 2/2005 | Onodera et al. |
| 6,872,139 B2 | 3/2005 | Sato et al. |
| 6,872,187 B1 | 3/2005 | Stark et al. |
| 6,888,076 B2 | 5/2005 | Hetherington |
| 6,913,559 B2 | 7/2005 | Smith |
| 6,936,016 B2 | 8/2005 | Berme et al. |
| D510,391 S | 10/2005 | Merril et al. |
| 6,975,302 B1 | 12/2005 | Ausbeck, Jr. |
| 6,978,684 B2 | 12/2005 | Nurse |
| 6,991,483 B1 | 1/2006 | Milan et al. |
| D514,627 S | 2/2006 | Merril et al. |
| 7,004,787 B2 | 2/2006 | Milan |
| D517,124 S | 3/2006 | Merril et al. |
| 7,011,605 B2 | 3/2006 | Shields |
| 7,033,176 B2 | 4/2006 | Feldman et al. |
| 7,038,855 B2 | 5/2006 | French et al. |
| 7,040,986 B2 | 5/2006 | Koshima et al. |
| 7,070,542 B2 | 7/2006 | Reyes et al. |
| 7,083,546 B2 | 8/2006 | Zillig et al. |
| 7,100,439 B2 | 9/2006 | Carlucci |
| 7,121,982 B2 | 10/2006 | Feldman |
| 7,126,584 B1 | 10/2006 | Nishiumi et al. |
| 7,127,376 B2 | 10/2006 | Nashner |
| 7,163,516 B1 | 1/2007 | Pagnacco et al. |
| 7,179,234 B2 | 2/2007 | Nashner |
| 7,195,355 B2 | 3/2007 | Nashner |
| 7,202,424 B2 | 4/2007 | Carlucci |
| 7,202,851 B2 | 4/2007 | Cunningham et al. |
| 7,270,630 B1 | 9/2007 | Patterson |
| 7,307,619 B2 | 12/2007 | Cunningham et al. |
| 7,308,831 B2 | 12/2007 | Cunningham et al. |
| 7,331,226 B2 | 2/2008 | Feldman et al. |
| 7,335,134 B1 | 2/2008 | LaVelle |
| RE40,427 E | 7/2008 | Nashner |
| 7,416,537 B1 | 8/2008 | Stark et al. |
| 7,530,929 B2 | 5/2009 | Feldman et al. |
| 7,722,501 B2 | 5/2010 | Nicolas et al. |
| 7,938,751 B2 | 5/2011 | Nicolas et al. |
| 2001/0001303 A1 | 5/2001 | Ohsuga et al. |
| 2001/0018363 A1 | 8/2001 | Goto et al. |
| 2001/0050683 A1 | 12/2001 | Ishikawa et al. |
| 2002/0055422 A1 | 5/2002 | Airmet et al. |
| 2002/0080115 A1 | 6/2002 | Onodera et al. |
| 2002/0185041 A1 | 12/2002 | Herbst |
| 2003/0054327 A1 | 3/2003 | Evensen |
| 2003/0069108 A1 | 4/2003 | Kaiserman et al. |
| 2003/0107502 A1 | 6/2003 | Alexander |
| 2003/0176770 A1 | 9/2003 | Merril et al. |
| 2003/0193416 A1 | 10/2003 | Ogata et al. |
| 2004/0038786 A1 | 2/2004 | Kuo et al. |
| 2004/0041787 A1 | 3/2004 | Graves |
| 2004/0077464 A1 | 4/2004 | Feldman et al. |
| 2004/0099513 A1 | 5/2004 | Hetherington |
| 2004/0110602 A1 | 6/2004 | Feldman |
| 2004/0127337 A1 | 7/2004 | Nashner |
| 2004/0163855 A1 | 8/2004 | Carlucci |
| 2004/0180719 A1 | 9/2004 | Feldman et al. |
| 2004/0259688 A1 | 12/2004 | Stabile |
| 2005/0070154 A1 | 3/2005 | Milan |
| 2005/0076161 A1 | 4/2005 | Albanna et al. |
| 2005/0130742 A1 | 6/2005 | Feldman et al. |
| 2005/0202384 A1 | 9/2005 | DiCuccio et al. |
| 2006/0097453 A1 | 5/2006 | Feldman et al. |
| 2006/0161045 A1 | 7/2006 | Merril et al. |
| 2006/0205565 A1 | 9/2006 | Feldman et al. |
| 2006/0211543 A1 | 9/2006 | Feldman et al. |
| 2006/0217243 A1 | 9/2006 | Feldman et al. |
| 2006/0223634 A1 | 10/2006 | Feldman et al. |
| 2006/0258512 A1 | 11/2006 | Nicolas et al. |
| 2007/0021279 A1 | 1/2007 | Jones |
| 2007/0027369 A1 | 2/2007 | Pagnacco et al. |
| 2007/0155589 A1 | 7/2007 | Feldman et al. |
| 2007/0219050 A1 | 9/2007 | Merril |
| 2008/0012826 A1 | 1/2008 | Cunningham et al. |
| 2008/0228110 A1 | 9/2008 | Berme |
| 2008/0261696 A1 | 10/2008 | Yamazaki et al. |
| 2009/0005906 A1* | 1/2009 | Tajima .......................... 700/245 |
| 2009/0093315 A1 | 4/2009 | Matsunaga et al. |
| 2009/0247909 A1* | 10/2009 | Mukumoto .................. 600/592 |

FOREIGN PATENT DOCUMENTS

| | | |
|---|---|---|
| DE | 297 12 785 | 1/1998 |
| DE | 20 2004 021 792 U1 | 5/2011 |
| DE | 20 2004 021 793 U1 | 5/2011 |
| EP | 0 275 665 | 7/1988 |
| EP | 0 299 738 | 1/1989 |
| EP | 0 335 045 | 10/1989 |
| EP | 0 519 836 | 12/1992 |
| EP | 1 043 746 A1 | 10/2000 |
| EP | 1 120 083 A2 | 8/2001 |
| EP | 1 127 599 A2 | 8/2001 |

(56) References Cited

FOREIGN PATENT DOCUMENTS

| | | |
|---|---|---|
| EP | 1 870 141 | 12/2007 |
| FR | 2 472 929 | 7/1981 |
| FR | 2 587 611 | 3/1987 |
| FR | 2 604 910 | 4/1988 |
| FR | 2 647 331 | 11/1990 |
| FR | 2 792 182 | 10/2000 |
| FR | 2 801 490 | 6/2001 |
| FR | 2 811 753 | 1/2002 |
| FR | 2 906 365 | 3/2008 |
| GB | 1 209 954 | 10/1970 |
| GB | 2 288 550 | 10/1995 |
| JP | 44-23551 | 10/1969 |
| JP | 55-95758 | 12/1978 |
| JP | 54-73689 | 6/1979 |
| JP | 55-113472 | 9/1980 |
| JP | 55-113473 | 9/1980 |
| JP | 55-125369 | 9/1980 |
| JP | 55-149822 | 11/1980 |
| JP | 55-152431 | 11/1980 |
| JP | 60-79460 | 6/1985 |
| JP | 60-153159 | 10/1985 |
| JP | 61-154689 | 7/1986 |
| JP | 62-034016 | 2/1987 |
| JP | 63-34016 | 2/1987 |
| JP | 63-158311 | 10/1988 |
| JP | 63-163855 | 10/1988 |
| JP | 63-193003 | 12/1988 |
| JP | 02-102651 | 4/1990 |
| JP | 2-238327 | 9/1990 |
| JP | 3-25325 | 2/1991 |
| JP | 3-103272 | 4/1991 |
| JP | 03-107959 | 11/1991 |
| JP | 6-063198 | 3/1994 |
| JP | 6-282373 | 10/1994 |
| JP | 7-213741 | 8/1995 |
| JP | 7-213745 | 8/1995 |
| JP | 7-241281 | 9/1995 |
| JP | 7-241282 | 9/1995 |
| JP | 7-275307 | 10/1995 |
| JP | 7-302161 | 11/1995 |
| JP | 8-43182 | 2/1996 |
| JP | 08-131594 | 5/1996 |
| JP | 08-182774 | 7/1996 |
| JP | 8-182774 | 7/1996 |
| JP | 08-184474 | 7/1996 |
| JP | 8-184474 | 7/1996 |
| JP | 8-215176 | 8/1996 |
| JP | 08-244691 | 9/1996 |
| JP | 2576247 | 1/1997 |
| JP | 9-120464 | 5/1997 |
| JP | 9-168529 | 6/1997 |
| JP | 9-197951 | 7/1997 |
| JP | 9-305099 | 11/1997 |
| JP | 11-309270 | 11/1999 |
| JP | 2000-146679 | 5/2000 |
| JP | U3068681 | 5/2000 |
| JP | U3069287 | 6/2000 |
| JP | 2000-254348 | 9/2000 |
| JP | 3172736 | 6/2001 |
| JP | 3172738 | 6/2001 |
| JP | 2001-178845 | 7/2001 |
| JP | 2001-286451 | 10/2001 |
| JP | 2002-112984 | 4/2002 |
| JP | 2002-157081 | 5/2002 |
| JP | 2002-253534 | 9/2002 |
| JP | 2003-79599 | 3/2003 |
| JP | 2003-235834 | 8/2003 |
| JP | 3722678 | 11/2005 |
| JP | 2005-334083 | 12/2005 |
| JP | 3773455 | 5/2006 |
| JP | 2006-167094 | 6/2006 |
| JP | 3818488 | 9/2006 |
| JP | 2006-284539 | 10/2006 |
| JP | U3128216 | 12/2006 |
| JP | 2008-49117 | 3/2008 |
| WO | WO 91/11221 | 8/1991 |
| WO | WO 92/12768 | 8/1992 |
| WO | WO 98/40843 | 9/1998 |
| WO | WO 00/12041 | 3/2000 |
| WO | WO 00/57387 | 9/2000 |
| WO | WO 00/69523 | 11/2000 |
| WO | WO 02/29375 | 4/2002 |
| WO | WO 02/057885 | 7/2002 |
| WO | WO 2004/051201 | 6/2004 |
| WO | WO 2004/053629 | 6/2004 |
| WO | WO 2005-043322 | 5/2005 |
| WO | WO 2008/099582 | 8/2008 |

OTHER PUBLICATIONS

Hugh Stewart, "Isometric Joystick: A Study of Control by Adolescents and Young Adults with Cerebral Palsy," The Australian Occupational Therapy Journal, Mar. 1992, vol. 39, No. 1, pp. 33-39.
Raghavendra S. Rao, et al., "Evaluation of an Isometric and a Position Joystick in a Target Acquisition Task for Individuals with Cerebral Palsy," IEEE Transactions on Rehabilitation Engineering, vol. 8, No. 1, Mar. 2000, pp. 118-125.
D. Sengupta, et al., "Comparative Evaluation of Control Surfaces for Disabled Patients,"Proceedings of the 27th Annual Conference on Engineering in Medicine and Biology, vol. 16, Oct. 6-10, 1974, p. 356.
Ian Bogost, "The Rhetoric of Exergaming,"The Georgia Institute of Technology, 9 pages (date unknown).
Ludonauts, "Body Movin'," May 24, 2004, http://web.archive.org/web/20040611131903/http:/www.ludonauts.com; retrieved Aug. 31, 2010, 4 pages.
Atari Gaming Headquarters—AGH's Atari Project Puffer Page, http://www.atarihq.com/othersec/puffer/index.html, retrieved Sep. 19, 2002, 4 pages.
Michael Antonoff, "Real estate is cheap here, but the places you'd most want to visit are still under construction," Popular Science, Jun. 1993, pp. 33-34.
Steve Aukstakalnis and David Blatner, "The Art and Science of Virtual Reality—Silicon Mirage," 1992, pp. 197-207.
Electronics, edited by Michael Antonoff, "Video Games—Virtual Violence: Boxing Without Bruises," Popular Science, Apr. 1993, p. 60.
Stuart F. Brown, "Video cycle race," Popular Science, May 1989, p. 73.
Scanning the Field for Ideas, "Chair puts Player on the Joystick," Machine Design, No. 21, Oct. 24, 1991, XP 000255214, 1 page.
Francis Hamit, "Virtual Reality and the Exploration of Cyberspace," University of MD Baltimore County, 1993, 4 pages.
Innovation in Action—Biofeed back Motor Control, Active Leg Press—IsoLegPress, 2 pages (date unknown).
Ric Manning, "Videogaming players get a workout with the Exertainment," The Gizmo Page from the Courier Journal Sep. 25, 1994, 1 page.
Tech Lines, Military—Arcade aces and Aviation—Winging it, Popular Mechanics, Mar. 1982, p. 163.
Sarju Shah, "Mad Catz Universal MC2 Racing Wheel: Mad Catz MC2 Universal," Game Spot, posted Feb. 18, 2005, 3 pages.
Joe Skorupa, "Virtual Fitness," Sports Science, Popular Mechanics, Oct. 1994, 3 pages.
AGH Musuem—Suncom Aerobics Joystick; http://atarihq.com/museum/2678/hardware/aerobics.html (retrieved date unknown) 1 page.
Nintendo Zone—The History of Nintendo (1889-1997), retrieved Aug. 24, 1998 pp. 1, 9-10.
The Legible City, Computergraphic Installation with Dirk Groeneveld, Manhattan version (1989), Amsterdam version (1990), Karlsruhe version (1991), 3 pages.
The New Exertainment System. It's All About Giving Your Members Personal Choices, Life Fitness, Circle Reader Service Card No. 28, 1995, 1 page.
The Race Begins with $85, Randal Windracer, Circle Reader Service Card No. 34, 1990, 1 page.
Universal S-Video/Audio Cable; Product #5015, MSRP 9.99; http://www.madcatz.com/Default/asp?Page=133 &CategoryImg=Universal_Cables, retrieved May 15, 2005, 1 page.

(56) References Cited

OTHER PUBLICATIONS

Tom Dang, et al., "Interactive Video Exercise System for Pediatric Brain Injury Rehabilitation," Assistive Technology Research Center, Rehabilitaion Engineering Service, National Rehabilitation Hospital, Proceedings of the RESNA 20th Annual Conference, Jun. 1998, 3 pages.

Linda S. Miller, "Upper Limb Exerciser," Biometrics Ltd—Unique Solutions for Clinical and Research Applications, 6 pages (date unknown).

Raymond W. McGorry, "A system for the measurement of grip forces and applied moments during hand tool use," Liberty Mutual Research Center for Safety and Health, Applied Ergonomics 32 (2001) 271-279.

NordicTrack's Aerobic Cross Trainer advertisement as shown in "Big Ideas—For a Little Money: Great Places to Invest $1,000 or Less," Kiplinger's Personal Finance Magazine, Jul. 1994, 3 pages.

Maurice R. Masliah, "Measuring the Allocation of Control in 6 Degree of Freedom Human-Computer Interaction Tasks," Graduate Department of Mechanical and Industrial Engineering, University of Toronto, 2001, 177 pages.

Leigh Ann Roman, "Boing! Combines Arcade Fun with Physical Training," Memphis—Health Care News: Monitoring the Pulse of Our Health Care Community, Sep. 20, 1996, One Section, 1 page.

"No More Couch Potato KIds," as shown in Orange Coast, Sep. 1994, p. 16.

Gary L. Downey, et al., "Design of an Exercise Arcade for Children with Disabilities," Resna, Jun. 26-30, 1998, pp. 405-407.

Frank Serpas, et al., "Forward-dynamics Simulation of Anterior Cruciate Ligament Forces Developed During Isokinetic Dynamometry," Computer Methods in Biomechanics and Biomedical Engineering, vol. 5 (1), 2002, pp. 33-43.

Carolyn Cosmos, "An 'Out of Wheelchair Experience'", The Washington Post, May 2, 2000, 3 pages.

"Look Ma! No Hands!", The Joyboard—Power Body Control, (date unknown).

David H. Ahl, "Controller update," Creative Computing, vol. 9, No. 12, Dec. 1983, p. 142.

Ian Bogost, "Water Cooler Games—The Prehistory of Wii Fit," Videogame Theory, Criticism, Design, Jul. 15, 2007, 2 pages.

Jeremy Reimer, "A history of the Amiga, part 2: The birth of Amiga," last updated Aug. 12, 2007, 2 pages.

The Amiga Joyboard (1982) image, Photos: Fun with plastic—peripheral that changed gaming; http://news.cnet.com/2300-27076_3-10001507-2.html (retrieved Jul. 23, 2010), 1 page.

The Amiga Power System Joyboard, Amiga history guide, http://www.amigahistory.co.uk/joyboard.html (retrieved Jul. 23, 2010), 2 pages.

"Joyboard," Wikipedia—the free encyclopedia, http://en.wikipedia.org/wiki/Joyboard (retrieved Jul. 26, 2010), 2 pages.

"Dance Dance Revolution," Wikipedia—the free encyclopedia, http://en.wikipedia.org/wiki/Dance Dance Revolution (retrieved Jul. 23, 2010), 9 pages.

"Cure for the couch potato," Kansas City Star (MO), Jan. 2, 2005, WLNR 22811884, 1 page.

JC Fletcher, "Virtually Overlooked: The Power Pad games," Joystiq, http://www.joystiq.com/2007/09/20/virtually-overlooked-the-power-pad-games/ (retrieved Jul. 26, 2010), 3 pages.

Family Fun Fitness, Nintendo Entertainment System, BANDAI, (date unknown).

"Power Pad/Family Fun and Fitness/Family Trainer," http://www.gamersgraveyard.com/repository/nes/peripherals/powerpad.html (retrieved Jul. 26, 2010), 2 pages.

"Power Pad Information," Version 1.0 (Sep. 23, 1999) http://www.gamersgraveyard.com/repository/nes/peripherals/powerpad.txt (retrieved Jul. 26, 2010), 2 pages.

Wii+Power+Pad.jpg (image), http://bp1.blogger.com/_J5LEiGp54l/RpZbNpnLDgl/AAAAAAAAAic/Gum6DD3Umjg/s1600-h/Wii+Power+Pad.jpg (retrieved Jul. 26, 2010), 1 page.

Vs. Slalom—Videogame by Nintendo, KLOV—Killer List of Video Games, http://www.arcade-museum.com/game_detail.php?game_id=10368 (retrieved Jul. 26, 2010), 3 pages.

"Nintendo Vs. System," Wikipedia—the free encyclopedia, http://en.wikipedia.org/wiki/Nintendo_Vs._System (retrieved Jul. 26, 2010), 3 pages.

Vs. Slalom—Step Up to the Challenge, Nintendo, (date unknown).

Vs. Slalom—Live the Thrill, Nintendo, (date unknown).

Vs. Slalom—Operation Manual, MDS(MGS), Nintendo, 4 pages, (date unknown).

HyperspaceArcade.com—Specialists in Arcade Video Game Repair and Restoration, http://www.hyperspacearcade.com/VSTypes.html (retrieved Jul. 3, 2010), 3 pages.

Vs. Slalom—Attachment Pak Manual; For Installation in: VS. UniSystem (UPRIGHT) and VS. DualSystem (UPRIGHT), TM of Nintendo of America Inc., 1986, 15 pages.

Leiterman, "Project Puffer: Jungle River Cruise," Atari, Inc., 1982, 2 pages.

Leiterman, "Project Puffer: Tumbleweeds," Atari, Inc., 1982, 1 page.

Jerry Smith, "Other Input Devices," Human Interface Technology Laboratory, 2 pages, (date unknown).

Trevor Meers, "Virtually There: VR Entertainment Transports Players to Entrancing New Worlds," Smart Computing, vol. 4, Issue 11, Nov. 1993, 6 pages.

"Dance Aerobics," Moby Games, Feb. 12, 2008, 2 pages.

"Hard Drivin'," KLOV—Killer List of Video Games, The International Arcade Museum, http://www.arcade-museum.com, 6 pages, (date unknown).

"The World's First Authentic Driving Simulation Game!", Hard Drivin'—Get Behind the Wheel and Feel the Thrill (image), Atari games Corporation, 1 page, (date unknown).

Electronic Entertainment Expo (E3) Overview, Giant Bomb—E3 2004 (video game concept), http://www.giantbomb.com/e3-2004/92-3436/ (retrieved Sep. 3, 2010), 3 pages.

Guang Yang Amusement, Product Name: Live Boxer, 1 page, (date unknown).

Family Fun Fitness: Basic Set (Control Mat and Athletic World Game Pak), Nintendo Entertainment System, Bandai, (date unknown).

Roll & Rocker (image), 1 page, (date unknown).

Roll & Rocker, Enteractive (image), 2 pages, (date unknown).

Michael Goldstein, "Revolution on Wheels—Thatcher Ulrich," Nov.-Dec. 1994, 3 pages.

"Playboy on the Scene: Ride On!", 1 page, (date unknown).

Candace Putnam, "Software for Hardbodies: A virtual-reality hike machine takes you out on the open road," Design, 1 page, (date unknown).

Rachel, "No-Sweat Exercise—Can you get healthier without really trying?" Fitness, 1 page, (date unknown).

Fitness article, Sep. 1994, p. 402-404.

"Wired Top 10: Best Selling Toys in Jun. 1994," Wired Sep. 1994, 1 page.

"Top Skater," Sega Amusements U.S.A. Inc, 1 page, (date unknown).

Katharine Alter, et al., "Video Games for Lower Extremity Strength Training in Pediatric Brian Injury Rehabilitation," National Rehabilitation Hospital, 18 pages, (date unknown).

Cateye Recumbent GameBike Pro: Latest Technology in Exercise Bikes, beyondmoseying.com High Performance Exercise Equipement, 2 pages (advertisement; no date).

Fitness Fun, while Exercising and Getting FIT for Kids, Teens and Adults, (advertisement, no date).

Warranty Information and Your Joyboard: How it Works, Amiga Corporation, date unknown, 2 pages.

Complaint for Patent Infringement, *IA Labs CA, LLC v. Nintendo Co., Ltd. and Nintendo of America, Inc.*, United States District Court for the District of Maryland Northern Division (Apr. 2, 2010), 317 pages.

Plaintiff IA Labs CA. LLC's Opening Claim Construction Brief, *IA Labs CA, LLC v. Nintendo Co., Ltd. and Nintendo of America, Inc.*, United States District Court for the District of Maryland Southern Division (Dec. 13, 2010), 36 pages.

Nintendo Co., Ltd. and Nintendo of America Inc.'s Opening Claim Construction Brief, *IA Labs CA, LLC v. Nintendo Co., Ltd. and*

(56) References Cited

OTHER PUBLICATIONS

*Nintendo of America, Inc.*, United States District Court for the District of Maryland Southern Division (Dec. 13, 2010), 55 pages.

Plaintiff IA Labs CA, LLC's Response Claim Construction Brief, *IA Labs CA, LLC v. Nintendo Co., Ltd. and Nintendo of America, Inc.*, United States District Court for the District of Maryland Southern Division (Jan. 16, 2011), 49 pages.

Nintendo Co., Ltd. and Nintendo of America Inc.'s Closing Claim Construction Brief, *IA Labs CA, LLC v. Nintendo Co., Ltd. and Nintendo and America, Inc.*, United States District Court for the District of Maryland Southern Division (Jan. 6, 2011), 25 pages.

Expert Report of Lee Rawls, Nov. 2, 2010, 37 pages (redacted).

Addlesee, M.D., et al., "The ORL Active Floor," IEEE—Personal Communications, Oct. 1997.

Back, Seongmin, et al., "Motion Evaluation for VR-based Motion Training," Eurographics 2001, vol. 20, No. 3, 2001.

Biodex Medical Systems, Inc.—Balance System SD Product Information—http://www.biodex.com/rehab/balance/balance_300feat.htm.

Chen, I-Chun, et al., "Effects of Balance Training on Hemiplegic Stroke Patients," Chang Gung Medical Journal, vol. 25, No. 9, pp. 583-590, Sep. 2002.

Dingwell, Jonathan, et al., "A Rehabilitation Treadmill with Software for Providing Real-Time Gait Analysis and Visual Feedback," Transactions of the ASME, Journal of Biomechanical Engineering, 118 (2), pp. 253-255, 1996.

Geiger, Ruth Ann, et al., "Balance and Mobility Following Stroke: Effects of Physical Therapy Interventions With and Without Biofeedback/Forceplate Training," Physical Therapy, vol. 81, No. 4, pp. 995-1005, Apr. 2001.

Harikae, Miho, "Visualization of Common People's Behavior in the Barrier Free Environment," Graduate Thesis—Master of Computer Science and Engineering in the Graduate School of the Unversity of Aizu, Mar. 1999.

Hodgins, J.K., "Three-Dimensional Human Running," Proceedings: 1996 IEEE International Conference on Robotics and Automation, vol. 4, Apr. 1996.

Kim, Jong Yun, et al., "Abstract—A New VR Bike System for Balance Rehabilitaiton Training," Proceedings: 2001 IEEE Seventh International Conference on Virtual Systems and Multimedia, Oct. 2001.

McComas, Joan, et al., "Virtual Reality Applications for Prevention, Disability Awareness, and Physical Therapy Rehabilitation in Neurology: Our Recent Work," School of Rehabilitation Sciences, University of Ottawa—Neurology Report, vol. 26, No. 2, pp. 55-61, 2002.

NeuroCom International Inc.—Balance Manager Systems/Products—http://resourcesonbalance.com/neurocom/products/index.aspx.

NeuroCom International Inc.—Neurogames—http://resourcesonbalance.com/neurocom/products/NeuroGames.aspx.

Nicholas, Deborah S, "Balance Retraining After Stroke Using Force Platform Feedback," Physical Therapy, vol. 77, No. 5, pp. 553-558, May 1997.

Nintendo Co., Ltd.—Aerobic Exercise Rhythm Boxing—http://www.nintendo.co.jp/wii/rfnj/training/aerobics/aerobics07.html.

Redfern, Mark, et al., "Visual Influences of Balance," Journal of Anxiety Disorders, vol. 15, pp. 81-94, 2001.

Sackley, Catherine, "Single Blind Randomized Controlled Trial of Visual Feedback After Stroke: Effects on Stance Symmetry and Function," Disavility and Rehabilitation, vol. 19, No. 12, pp. 536-546, 1997.

Tossavainen, Timo, et al., "Postural Control as Assessed with Virtual Reality," Acta Otolaryngol, Suppl 545, pp. 53-56, 2001.

Tossavainen, Timo, et al., "Towards Virtual Reality Simulation in Force Platfrom Posturography," MEDINFO, pp. 854-857, 2001.

Tsutsuguchi, Ken, et al., "Human Walking Animation Based on Foot Reaction Force in the Three-Dimensional Virtual World," The Journal of Visualization and Computer Animation, vol. 11, pp. 3-16, 2000.

Wong, Alice, et al., "The Development and Clinical Evaluation of a Standing Biofeedback Trainer," Journal of Rehabilitation Research and Development, vol. 34, No. 3, pp. 322-327, Jul. 1997.

Yang, Ungyeon, et al., "Implementation and Evalution of 'Just Follow Me': An Immersive, VR-Based, Motion-Training System," Presence, vol. 11, No. 3, pp. 304-323, 2002.

Nintendo Co., Ltd. and Nintendo of America's Opposition to IA Labs CA, LLC's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), including the Appendix of Exhibits and Exhibits A-R, 405 pages.

Declaration of R. Lee Rawls in Support of Nintendo Co., Ltd. and Nintendo of America Inc.'s Opposition to IA Labs CA. LLC's Motion for Partial Summary Judgment, *IA Labs CA, LLC*, (Plaintiff) v. *Nintendo Co., Ltd. et al.*, (Defendent), United States District Court for the District of Maryland Southern Division (May 16, 2011), including Exhibits 1, 3-12, 193 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendent), United States District Court for the District of Maryland Southern Division (May 16, 2011), 7 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendent), United States District Court for the District of Maryland Southern Division (May 16, 2011), Appendix of Exhibits, 2 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendent), United States District Court for the District of Maryland Southern Division (May 16, 2011), Exhibit 1, 36 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendent), United States District Court for the District of Maryland Southern Division (May 16, 2011), Exhibit 2, 40 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendent), United States District Court for the District of Maryland Southern Division (May 16, 2011), Exhibit 3, 85 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendent), United States District Court for the District of Maryland Southern Division (May 16, 2011), Exhibit 4, 10 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendent), United States District Court for the District of Maryland Southern Division (May 16, 2011), Exhibit 5, 9 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendent), United States District Court for the District of Maryland Southern Division (May 16, 2011), Exhibit 6, 17 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendent), United States District Court for the District of Maryland Southern Division (May 16, 2011), Exhibit 7, 16 pages.

(56) References Cited

OTHER PUBLICATIONS

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendent), United States District Court for the District of Maryland Southern Division (May 16, 2011), Exhibit 8, 45 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendent), United States District Court for the District of Maryland Southern Division (May 16, 2011), Exhibit 9, 4 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendent), United States District Court for the District of Maryland Southern Division (May 16, 2011), Exhibit 10, 22 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendent), United States District Court for the District of Maryland Southern Division (May 16, 2011), Exhibit 11, 27 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendent), United States District Court for the District of Maryland Southern Division (May 16, 2011), Exhibit 12, 3 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendent), United States District Court for the District of Maryland Southern Division (May 16, 2011), Exhibit 13, 7 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendent), United States District Court for the District of Maryland Southern Division (May 16, 2011), Exhibit 14, 22 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendent), United States District Court for the District of Maryland Southern Division (May 16, 2011), Exhibit 15, 45 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendent), United States District Court for the District of Maryland Southern Division (May 16, 2011), Exhibit 16, 42 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendent), United States District Court for the District of Maryland Southern Division (May 16, 2011), Exhibit 17, 19 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendent), United States District Court for the District of Maryland Southern Division (May 16, 2011), Exhibit 18, 27 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendent), United States District Court for the District of Maryland Southern Division (May 16, 2011), Exhibit 19, 13 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendent), United States District Court for the District of Maryland Southern Division (May 16, 2011), Exhibit 20, 29 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendent), United States District Court for the District of Maryland Southern Division (May 16, 2011), Exhibit 21, 25 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendent), United States District Court for the District of Maryland Southern Division (May 16, 2011), Exhibit 22, 11 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendent), United States District Court for the District of Maryland Southern Division (May 16, 2011), Exhibit 23, 20 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendent), United States District Court for the District of Maryland Southern Division (May 16, 2011), Exhibit 24, 7 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendent), United States District Court for the District of Maryland Southern Division (May 16, 2011), Exhibit 25, 80 pages.

Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendent), United States District Court for the District of Maryland Southern Division (May 16, 2011), Exhibit 26, 32 pages.

U.S. Trademark Application No. 74/402,755, filed Jun. 14, 1993, 43 pages.

"AccuSway Dual Top: For Balance and Postural Sway Measurement," AMTI: Force and Motion, ISO 9001:2000, 2 pages.

Borzelli G., Cappozzo A., and Papa E., "Inter- and intra-individual variablity of ground rejection forces during sit-to-stand with principal component analysis," Medical Engineering & Physics 21 (1999), pp. 235-240.

Chiari L., Cappello A., Lenzi D., and Della Croce U, "An Improved Technique for the Extraction of Stochasitc Parameters from Stabilograms," Gait and Posture 12 (2000), pp. 225-234.

Cutlip R., Hsiao H., Garcia R., Becker E., Mayeux B., "A comparison of different postures for scaffold end-frame disassembly," Applied Ergonomics 31 (2000), pp. 507-513.

Davis K.G., Marra W.S., Water T.R., "Evaluation of spinal loading lowering and lifting," The Ohio State University, Biodynamics Laboratory, Clinical Biomechanics vol. 13, No. 3, 1998 pp. 141-152.

Rolf G. Jacob, Mark S. Redfern, Joseph M. Furman, "Optic Flow-induced Sway in Anxiety Disorders Associated with Space and Motion Discomfort," Journal of Anxiety Disorders, vol. 9, No. 5, 1995, pp. 411-425.

Jorgensen M.J., Marras W.S., "The effect of lumber back support tension on trunk muscle activity," Clinical Biomechanics 15 (2000), pp. 292-294.

Deborah L. King and Vladimir M. Zatsiorsky, "Extracting gravity line displacement from stabilographic recordings," Gait & Posture 6 (1997), pp. 27-38.

(56) References Cited

OTHER PUBLICATIONS

Kraemer W.J., Volck J.S., Bush J.A., Gotshalk L.A., Wagner P.R., Gómez A.L., Zatsiorsky V.M., Duzrte M., Ratamess N.A., Mazzetti S.A., Selle B.J., "Influence of compression hosiery on physiological responses to standing fatigue in women," The Human Performance Laboratory, Medical & Science in Sports & Exercise, 2000, pp. 1849-1858.

Papa E. and Cappozzo A., "A telescopic inverted-pendulum model of the musculo-skeletal system and its use for the analysis of the sit-to-stand motor task," Journal of Biomechanics 32 (1999), pp. 1205-1212.

Balance System, BalanceTrak 500, & Quantrem, ZapConnect.com: Medical Device Industry Portal, http://www.zapconnect.com/products/index/cfm/fuseaction/products, 2 pages. (Retrieved Apr. 5, 2011).

Bertec: Dominate Your Field, Physician's Quick Guide, Version 1.0.0, Feb. 2010, 13 pages.

Bertec: Dominate Your Field, Balancecheck Screener, Version 1.0.0, Feb. 2010, 35 pages.

Bertec: Dominate Your Field, Balancecheck Trainer, Version 1.0.0, Feb. 2010, 37 pages.

Bertec Corporation—Balancecheck Standard Screener Package, http://bertec.com/products/balance-systems/standard-screener.html, 1 page. (Retrieved Apr. 12, 2011).

Bertec Corporation—Balance Systems: Balancecheck Advanced balance assessment & training products for the balance professional, http://bertec.com/products/balance-systems/html, 1 page. (Retrieved Mar. 31, 2011).

Bertec Corporation—Balancecheck Mobile Screener Package: Portable Balance screening with full functionality, http://bertec.com/products/balance-systems/mobile-screener.html, 1 page. (Retrieved Mar. 31, 2011).

Bertec Corporation—Balancecheck Standard Screener & Trainer Package: Advanced balance screening and rehabilitation system, http://bertec.com/products/balance-systems/standard-screener-trainer.html, 1 page. (Retrieved Mar. 31, 2011).

U.S. Trademark Application No. 75/136,330, filed Jul. 19, 1996, 47 pages.

Bertec: Dominate Your Field, Digital Acquire 4, Version 4.0.10, Mar. 2011, 22 pages.

Bertec: Dominate Your Field, Bertec Force Plates, Version 1.0.0, Sep. 2009, 31 pages.

Bertec: Dominate Your Field, Product Information: Force Plate FP4060-08:Product Details and Specifications, 4 pages.

Bertec: Dominate Your Field, Product Information: Force Plate FP4060-10:Product Details and Specifications, 2 pages.

U.S. Trademark Application No. 75/542,230, filed Jun. 10, 1985, 52 pages.

Brent L. Arnold and Randy J. Schmitz, "Examination of Balance Measures Produced by the Biodex Stability System," Journal of Athletic Training, vol. 33(4), 1995, pp. 323-327.

Trademark Registration No. 1,974,115 filed Mar. 28, 1994, 8 pages.

ICS Balance Platform, Fall Prevention: Hearing Assessment, Fitting Systems, Balance Assessment, Otometrics,: Madsen, Aurical, ICS, 2 pages.

U.S. Trademark Application No. 75/471,542, filed Apr. 16, 1998, 102 pages.

VTI Force Platform, Zapconnect.com: Medical Device Industry Portal, http://zapconnect/com/products/index.cfm/fuseaction/products, 2 pages. (Retrieved Apr. 5, 2011).

Amin M., Girardi M., Konrad H.R., Hughes L., "A Comparision of Electronystagmorgraphy Results with Posturography Findings from the BalanceTrak 500," Otology Neurotology, 23(4), 2002, pp. 488-493.

Girardi M., Konrad H.R., Amin M., Hughes L.F., "Predicting Fall Risks in an Elderly Population: Computer Dynamic Posturography Versus Electronystagmography Test Results," Laryngoscope, 111(9), 2001, 1528-32.

Dr. Guido Pagnacco, Publications, 1997-2008, 3 pages.

College of Engineering and Applied Science: Electrical and Computer Engineering, University of Wyoming, Faculty: Guido Pagnacco, http://wwweng.uwyo.edu/electrical/faculty/Pagnacco.html, 2 pages. (Retrieved Apr. 20, 2011).

EyeTracker, IDEAS, DIFRA, 501(k) Summary: premarket notification, Jul. 5, 2007, 7 pages.

Vestibular technologies, copyright 2000-2004, 1 page.

Scopus preview—Scopus—Author details (Pagnacco, Guido), http:www.scopus.com/authid/detail.url?authorId=6603709393, 2 pages. (Retrieved Apr. 20, 2011).

Vestibular Technologies Company Page, "Vestibular technologies: Helping People Regain their Balance for Life," http:www.vestibtech.com/AboutUs.html, 2 pages. (Retrieved Apr. 20, 2011).

GN Otometrics Launces ICS Balance Platform: Portable system for measuring postural sway, http://audiologyonline.com/news/pf_news_detail/asp?news_id=3196, 1 page. (Retrived Mar. 31, 2011).

U.S. Trademark Application No. 75/508,272, filed Jun. 25, 1998, 36 pages.

U.S. Trademark Application No. 75/756,991, filed Jul. 21, 1999, 9 pages.

U.S. Trademark Application No. 76/148,037, filed Oct. 17, 2000, 78 pages.

Vestibular technologies, VTI Products: BalanceTRAK User's Guide, Preliminary Version 0.1, 2005, 34 pages.

U.S. Trademark Application No. 76/148,037, filed Oct. 17, 2000, 57 pages.

Vestibular Technologies, Waybackmachine, http://vestibtech.com/balancetrak500.html, 7 pages. (Retrieved Mar. 30, 2011).

Vestibular Technologies, 2004 Catalog, 32 pages.

The Balance Trak 500—Normative Data, 8 pages.

State of Delaware: The Official Website of the First State, Division of Corporation—Online Services, http://delecrop.delaware.gov/tin/controller, 2 pages. (Retrieved Mar. 21, 2011).

Memorandum in Support of Plaintiff IA Labs'0 Motion for Partial Summary Judgment on Defendants' Affirmative Defense and Counterclaim That U.S. Patent No. 7,121,982 is Invalid Under 35 U.S.C. §§ 102 and 103, *IA Labs CA, LLC*, (Plaintiff) v. *Nintendo Co., Ltd. et al.*, (Defendant), United States District Court for the District of Maryland Southern Division (Apr. 27, 2011), 17 pages.

Search Report (2 pgs.) dated May 27, 2011 issued in German Application No. 20 2004 021 793.7.

\* cited by examiner

F I G. 5
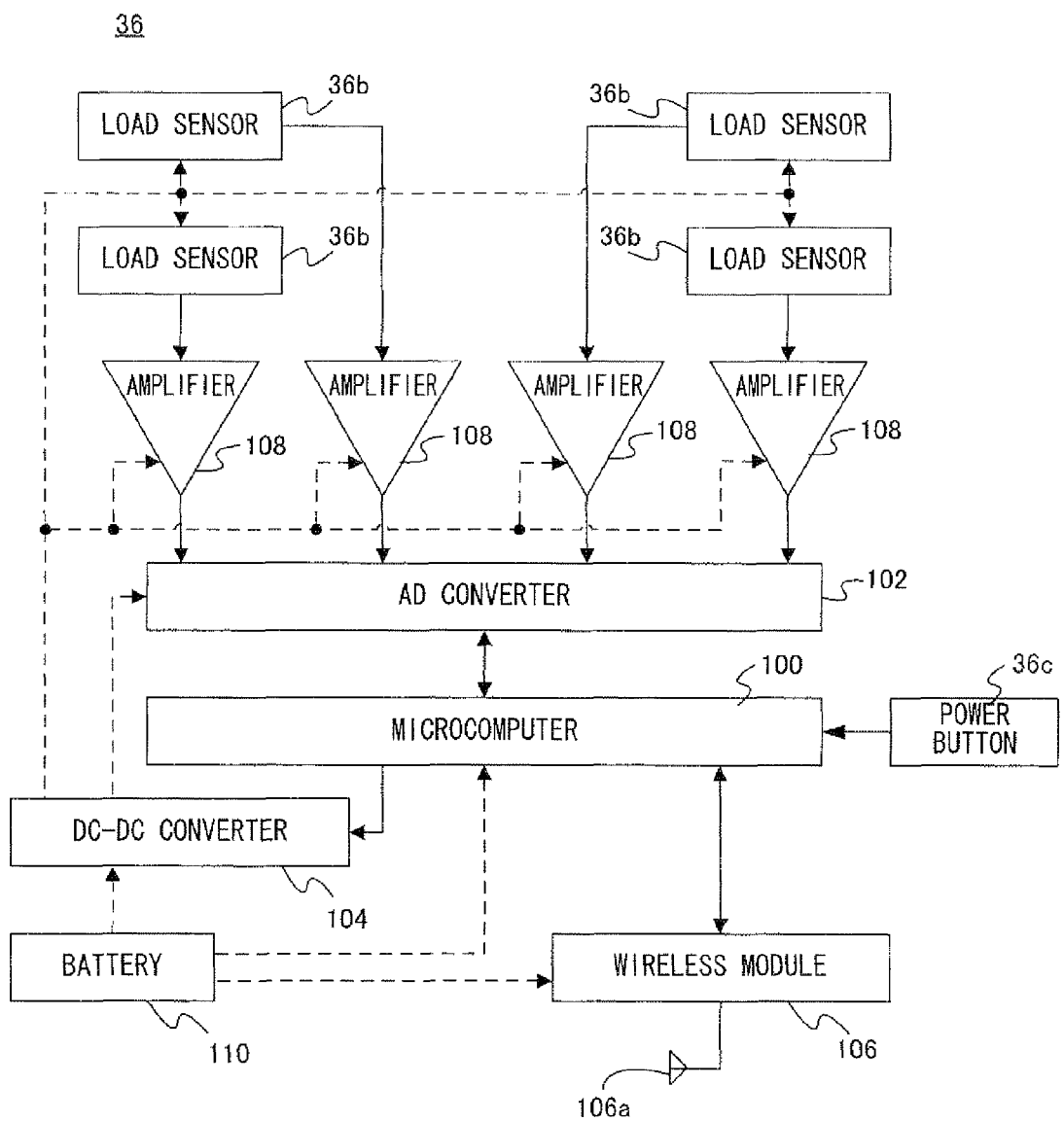

F I G. 1 5
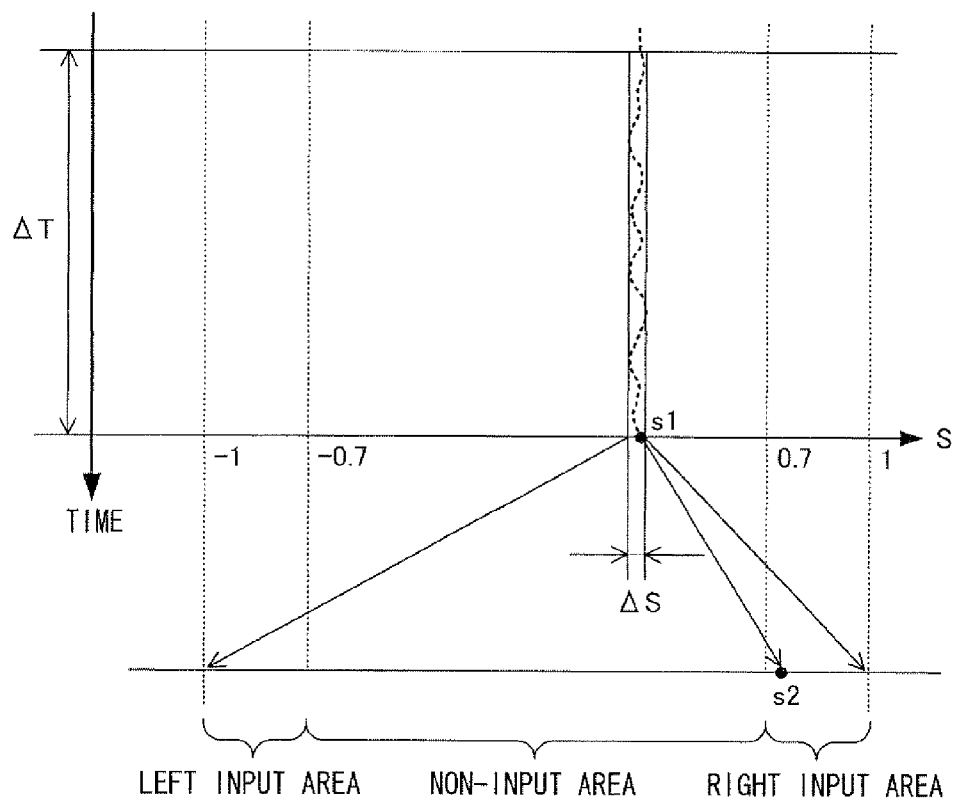

F I G. 1 7
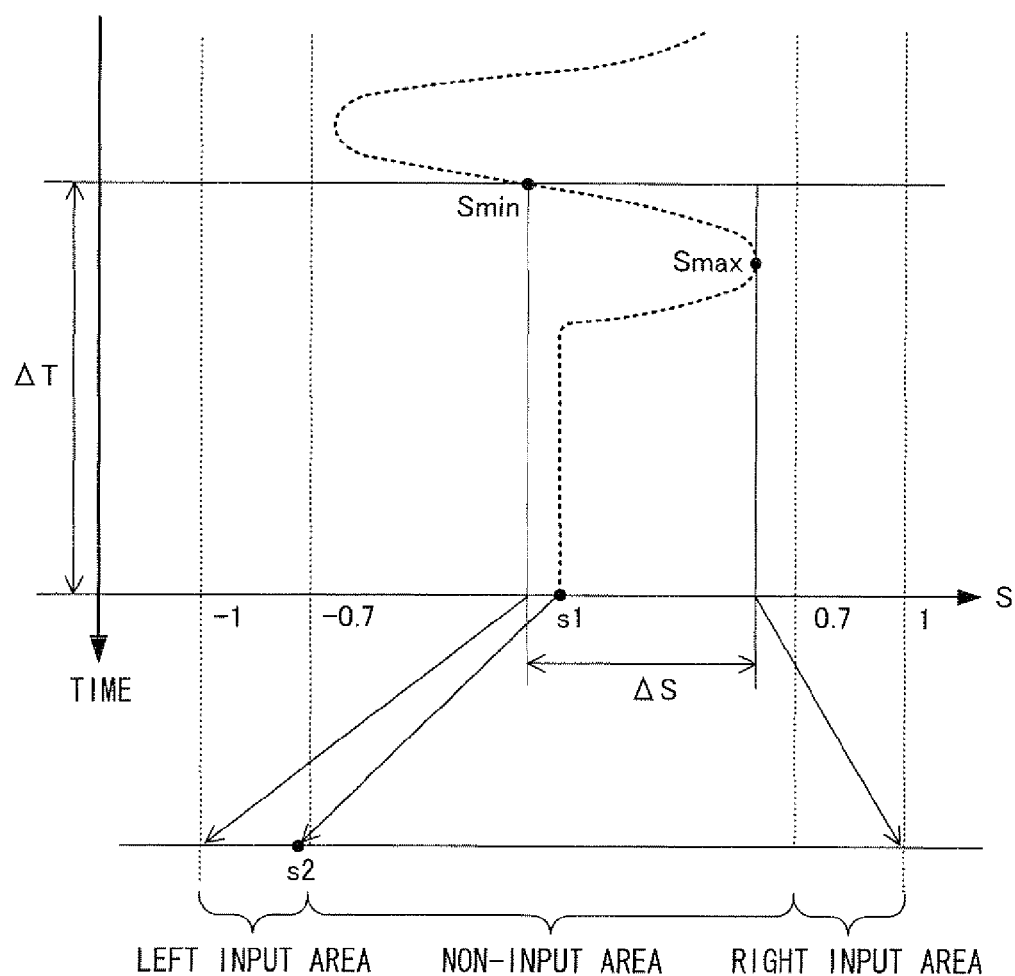

F I G. 2 1
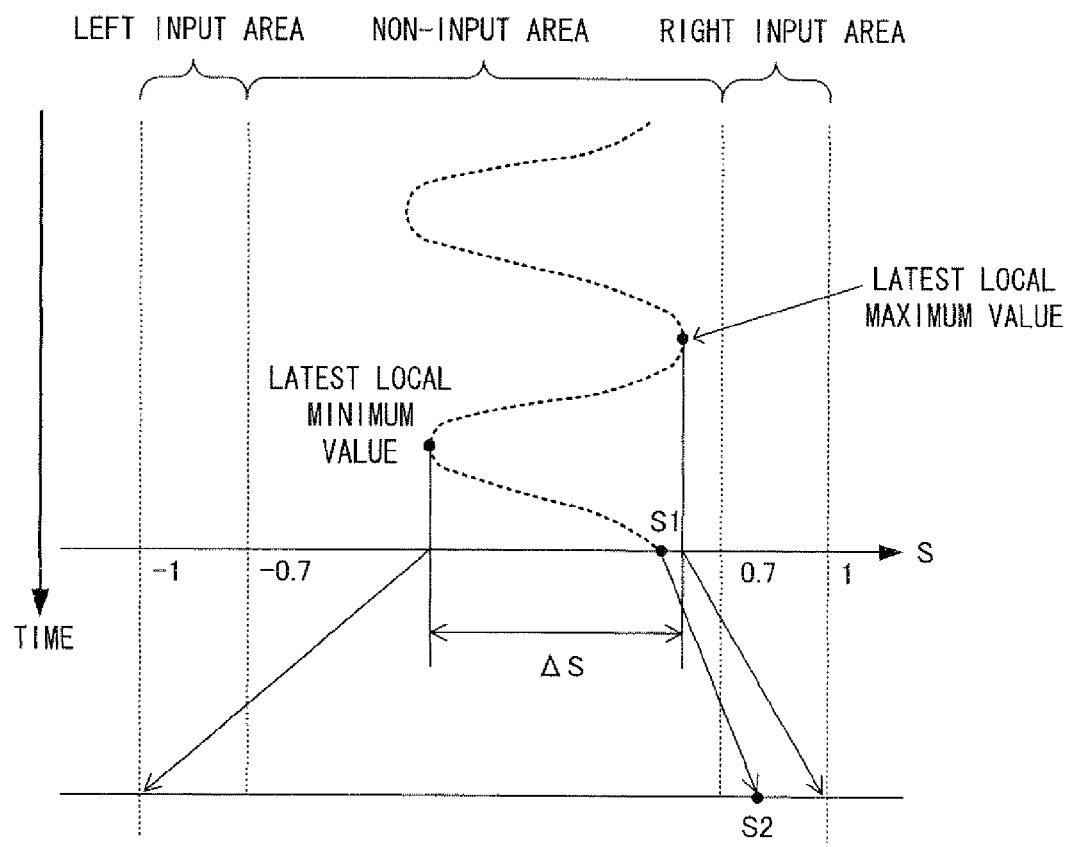

COMPUTER-READABLE STORAGE MEDIUM HAVING STORED INFORMATION PROCESSING PROGRAM THEREON, AND INFORMATION PROCESSING APPARATUS

CROSS REFERENCE TO RELATED APPLICATION

The disclosure of Japanese Patent Application No. 2009-225312, filed on Sep. 29, 2009, is incorporated herein reference.

BACKGROUND OF THE INVENTION

1. Field of the Invention

The present invention relates to a computer-readable storage medium having stored an information processing program thereon, and an information processing apparatus, and in particular, to a computer-readable storage medium having stored thereon an information processing program that executes a predetermined process based on the gravity center position of a user, and an information processing apparatus that executes a predetermined process based on the gravity center position of a user.

2. Description of the Background Art

Conventionally, there is a known information processing program that moves, based on the gravity center position of a user, a character displayed on a screen (e.g. see Japanese Laid-Open Patent Publication No. 2005-334083). In this information processing program, a predetermined neutral area is set. When the gravity center position is moved out of the neutral area, movement of the character is started, and when the gravity center position is not moved out of the neutral area, the character is not moved.

However, in an information processing program disclosed in Japanese Laid-Open Patent Publication No. 2005-334083, because there is the possibility that the gravity center position is different among users, there is the case where, even though a user desires to move a character, the character is not moved because the gravity center position of the user is not moved out of a predetermined neutral area; and there is the case where, even though the user does not desire to move the character, the character is moved because the gravity center position of the user is moved out of the predetermined neutral area. Thus, the user cannot move the character as intended, and there is a problem that the user cannot obtain excellent operational feeling.

SUMMARY OF THE INVENTION

Therefore, an object of the present invention is to improve user's operational feeling in an information processing apparatus that executes a predetermined process based on the gravity center position of a user.

The present invention has the following features to attain the object mentioned above.

A computer-readable storage medium according to the present invention is a computer-readable storage medium having stored thereon an information processing program that causes a computer of an information processing apparatus, which is connected to a gravity center position detection device for detecting the gravity center position of a user, to operate as: gravity center position data obtaining means, variation range detection means, and information processing means.

The gravity center position data obtaining means sequentially obtains, from the gravity center position detection device, gravity center position data indicative of the gravity center position of the user.

The variation range detection means detects a variation range of the gravity center position of the user during a predetermined period to the current time, based on gravity center position data that is previously obtained by the gravity center position data obtaining means.

The information processing means executes a predetermined information process based on a relative position of a gravity center position, indicated by a latest gravity center position data that is obtained by the gravity center position data obtaining means, with respect to the variation range that is detected by the variation range detection means.

The "relative position of a gravity center position, indicated by a latest gravity center position data that is obtained by the gravity center position data obtaining means, with respect to the variation range that is detected by the variation range detection means" may be, for example, a relative position of the gravity center position, indicated by the latest gravity center position data, with respect to a predetermined reference position (e.g., the minimum value, the maximum value, and the middle position of the variation range, and the like) in the variation range that is detected by the variation range detection means. Further, for example, when the width of the variation range that is detected by the variation range detection means is defined as 100%, the "relative position" may be information indicative of what percentage the gravity center position indicated by the latest gravity center position is located off from the predetermined reference position (e.g., the minimum value, the maximum value, and the middle position) in the variation range. Whereby, with the variation range of previous gravity center positions being used as a reference, the information processing is executed based on the relative position of the latest gravity center position with respect to this variation range. Thus, a tendency of the gravity center position unique to the user can be reflected in the information process. Therefore, operational feeling of the user can be improved.

It is noted that the information processing program may further cause the computer to operate as storage control means for storing, in a storage area, the gravity center position data that is obtained by the gravity center position data obtaining means.

Further, the information processing means may include gravity center position correction means for correcting the latest gravity center position data that is obtained by the gravity center position data obtaining means, in accordance with the variation range that is detected by the variation range detection means, and the information processing means may execute the predetermined information process based on the latest gravity center position data that has been corrected by the gravity center position correction means.

Further, the gravity center position correction means may correct the latest gravity center position that is obtained by the gravity center position data obtaining means, based on a linear conversion function by which a minimum value and a maximum value of the variation range that is detected by the variation range detection means are converted into a predetermined first fixed value and a predetermined second fixed value, respectively. By so correcting the gravity center position, the gravity center position is normalized in accordance with the variation range of the gravity center position. Thus, even when the variation range of the gravity center position is located off a desired position, or even when the width of the variation range of the gravity center position is smaller than a desired width, a process in accordance with the gravity center position can be appropriately executed.

Further, the first fixed value and the second fixed value may be a lower limit and an upper limit, respectively, of gravity center position data that can be obtained by the gravity center position data obtaining means.

Further, the information processing means may include variation width determination means for determining whether or not the width of the variation range that is detected by the variation range detection means is equal to or greater than a predetermined threshold. In the case where the width of the variation range is equal to or greater that the predetermined threshold, the information processing means may execute the predetermined information process when the relative position meets a predetermined condition. In the case where the width of the variation range is not equal to or greater that the predetermined threshold, the information processing means may not execute the predetermined information process even when the relative position meets the predetermined condition. Whereby, an erroneous determination that can occur when the variation range of the gravity center position is narrow can be eliminated.

Further, the information processing means may include variation width determination means for determining whether or not the width of the variation range that is detected by the variation range detection means is equal to or greater than a predetermined threshold. In the case where the width of the variation range is equal to or greater that the predetermined threshold, the information processing means may execute the predetermined information process based on the relative position. In the case where the width of the variation range is not equal to or greater that the predetermined threshold, the information processing means may execute the predetermined information process based on the latest gravity center position that is obtained by the gravity center position data obtaining means. Whereby, an erroneous determination that can occur when the variation range of the gravity center position is narrow can be eliminated. In addition, even when the gravity center position gently varies, a process in accordance with the gravity center position can be appropriately executed.

Further, the information processing means may include gravity center movement determination means for determining whether or not a difference between the gravity center position indicated by the latest gravity center position data that is obtained by the gravity center position data obtaining means and a gravity center position indicated by gravity center position data that is obtained immediately before the latest gravity center position data is obtained, is equal to or greater than a predetermined variation threshold. In the case where the difference is equal to or greater than the predetermined variation threshold, the information processing means may execute the predetermined information process when the relative position meets a predetermined condition. In the case where the difference is not equal to or greater than the predetermined variation threshold, the information processing means may not execute the predetermined information process even when the relative position meets the predetermined condition. Whereby, an erroneous determination that can occur when variation of the gravity center position stops can be eliminated.

Further, the information processing means may include threshold determination means for comparing the latest gravity center position that is obtained by the gravity center position data obtaining means with one or more predetermined determination thresholds, and the information processing means may execute the predetermined information process in accordance with a result of the comparison.

Further, the information processing means may include determination threshold correction means for correcting the one or more predetermined determination thresholds in accordance with the variation range that is detected by the variation range detection means.

Further, the determination threshold correction means corrects the one or more predetermined determination thresholds based on a linear conversion function by which a predetermined first fixed value and a predetermined second fixed value are converted into a minimum value and a maximum value, respectively, of the variation range that is detected by the variation range detection means. By so correcting the determination thresholds, the substantially same effects as that when the gravity center position is normalized in accordance with the variation range of the gravity center position, are obtained. Thus, even when the gravity center position is located off a desired position, or even when the width of the variation range of the gravity center position is smaller than a desired width, a process in accordance with the gravity center position can be appropriately executed.

Further, the first fixed value and the second fixed value may be a lower limit and an upper limit, respectively, of gravity center position data that can be obtained by the gravity center position data obtaining means.

Further, the information processing means may include middle position calculation means for calculating a middle position of the variation range that is detected by the variation range detection means, and the information processing means may execute the predetermined information process based on a relative position of the gravity center position, indicated by the latest gravity center position that is obtained by the gravity center position data obtaining means, with respect to the middle position. Whereby, even when the variation range of the gravity center position is located off a desired position, a process in accordance with the gravity center position can be appropriately executed.

Further, the variation range detection means may detect, as the variation range of the gravity center position of the user, a range from a minimum value to a maximum value of gravity center position data that is obtained during a latest predetermined period.

Further, the variation range detection means may detect, as the variation range of the gravity center position of the user, a range from a minimum value to a maximum value of gravity center position data that is previously obtained.

Further, the variation range detection means may detect, as the variation range of the gravity center position of the user, a range from a minimum value to a maximum value of gravity center position data that is obtained during a period from start of execution of the information processing program to the current time.

Further, the information processing means may include: means for determining whether or not the user performs stepping based on the relative position; means for performing movement control of an object in a virtual space, based on a result of the determination; and means for generating an image of the object and displaying the image on a display screen.

It is noted that the information processing program may be stored in any computer-readable storage medium (e.g., a flexible disc, a hard disk, an optical disc, a magneto-optical disc, a CD-ROM, a CD-R, a magnetic tape, a nonvolatile semiconductor memory card, a ROM, etc.)

An information processing apparatus according to the present invention includes gravity center position data obtaining means, variation range detection means, and information processing means.

The gravity center position data obtaining means sequentially obtains, from a gravity center position detection device for detecting the gravity center position of a user, gravity center position data indicative of the gravity center position of the user.

The variation range detection means detects a variation range of the gravity center position of the user during a predetermined period to the current time, based on gravity center position data that is previously obtained by the gravity center position data obtaining means.

The information processing means executes a predetermined information process based on a relative position of a gravity center position, indicated by a latest gravity center position data that is obtained by the gravity center position data obtaining means, with respect to the variation range that is detected by the variation range detection means.

According to the present invention, in the information processing apparatus that executes a predetermined process based on the gravity center position of the user, operational feeling of the user can be improved.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a block diagram showing an example of an electrical configuration of the load controller;

FIG. 15 shows another example of a shift of a gravity center position;

FIG. 17 shows another example of a shift of a gravity center position;

FIG. 21 is a view for explaining another modified example of the second input determination process.

DESCRIPTION OF THE PREFERRED EMBODIMENTS

The following will describe embodiments of the present invention with reference to the drawings.

(Game System)

Figure 1:
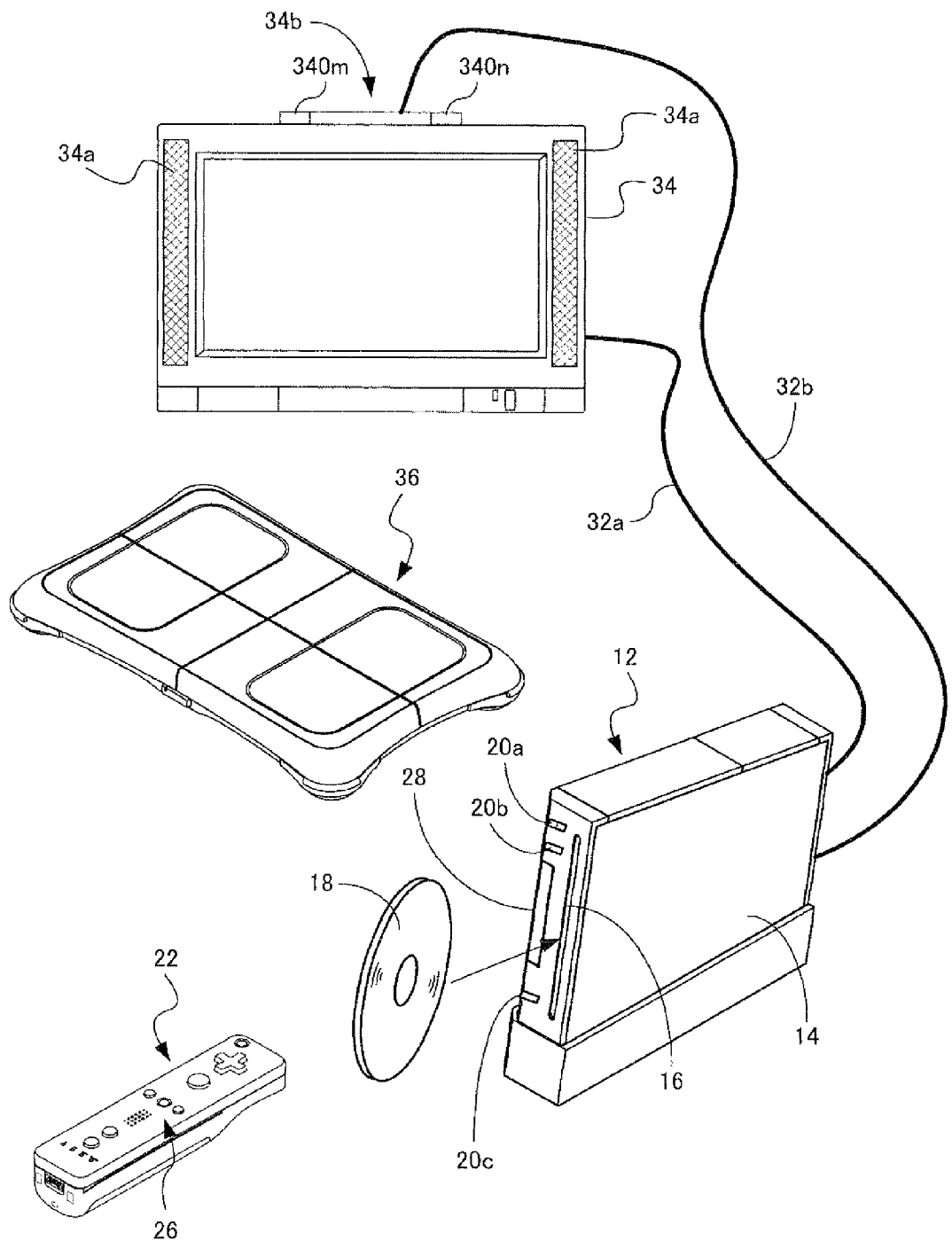
FIG. 1 is a view of a game system according to one embodiment of the present invention.

First, a game system used in the present embodiment will be described. As shown in FIG. 1, a game system 10 includes a video game apparatus (hereinafter, referred to merely as "game apparatus") 12, a controller 22, and a load controller 36. Although not shown in the drawings, the game apparatus 12 of the present embodiment is designed so as to be capable of communicating with four controllers (22, 36). The game apparatus 12 is connected to each controller (22, 36) wirelessly. For example, the wireless communication is performed in accordance with the Bluetooth standard, but may be performed in accordance with another standard of infrared communication, a wireless LAN, or the like.

The game apparatus 12 includes a parallelepiped-shaped housing 14 provided with a disc slot 16 on a front surface thereof. Through the disc slot 16, an optical disc 18, which is an example of an information storage medium having stored thereon a game program and the like, is inserted, and mounted to a disc drive 54 (see FIG. 2) in the housing 14. Around the disc slot 16, an LED and a light guide plate are arranged, and the LED is capable of being lit in response to various processes.

Further, on an upper portion of the front surface of the housing 14 of the game apparatus 12, a power button 20a and a reset button 20b are provided, and on a lower portion thereof, an eject button 20c is provided. In addition, an external memory card connector cover 28 is provided between the reset button 20b and the eject button 20c and adjacent to the disc slot 16. Inside the external memory card connector cover 28, an external memory card connector 62 (see FIG. 2) is provided, and an external memory card (not shown; hereinafter, referred to merely as "memory card") is inserted into the external memory card connector 62. The memory card is used for loading and temporally storing the game program and the like read out from the optical disc 18, and for storing (saving) game data (result data or midstream data of a game) of the game played using the game system 10. However, the game data may be stored in an internal memory such as a flash memory 44 (see FIG. 2) provided in the game apparatus 12, instead of the memory card. Further, the memory card may be used as a backup memory for the internal memory.

As the memory card, a general-purpose SD card can be used, but other general-purpose memory cards such as a memory stick and a Multi-Media Card (registered trademark) can be used.

On a rear surface of the housing 14 of the game apparatus 12, an AV connector 58 (see FIG. 2) is provided, and a monitor 34 and speakers 34a are connected to the game apparatus 12 through an AV cable 32a by means of the AV connector 58. The monitor 34 and the speakers 34a typically constitute a color television receiver, and a video signal and an audio signal from the game apparatus 12 are inputted to a video input terminal and an audio input terminal, respectively, of the color television receiver through the AV cable 32a. Thus, a game image of a three-dimensional (3D) video game is displayed on the screen of the color television receiver (monitor) 34, and stereo game sound such as game music, effect sound, and the like is outputted from both speakers 34a. Further, a marker section 34b including infrared LEDs (markers) 340m and 340n is provided adjacent to the monitor 34 (on the upper side of the monitor 34 in the present embodiment). The marker section 34b is connected to the game apparatus 12 through a power cable 32b. Thus, electric power is supplied from the game apparatus 12 to the marker section 34b. Whereby, the markers 340m and 340n emit infrared light forward from the monitor 34.

The electric power is supplied to the game apparatus 12 through a general AC adapter (not shown). The AC adapter is inserted into a household standard wall socket, and the game apparatus 12 converts household power (commercial power) into a low DC-voltage signal that is suitable for driving the game apparatus 12. In an alternative embodiment, a battery may be used as a power source.

In the game system 10, in order for a user (hereinafter, may be referred to as a player) to play a game (it is not limited thereto, and may be another application), the user turns on the game apparatus 12, and then selects an appropriate optical disc 18 storing the application of the video game (or another application that the user desires to play), and the optical disc 18 is loaded onto the disc drive 54 of the game apparatus 12. Accordingly, the game apparatus 12 starts to execute the video game or the other application based on a program stored in the optical disc 18. The user operates the controller 22 for performing an input to the game apparatus 12. For example, by operating any one of input means 26, the use starts the game or the other application. Further, the controller 22 is provided with: an acceleration sensor for detecting acceleration in three-axis directions; and an imaging means for taking images of the infrared light emitted by the markers 340m and 340n. In addition to operating the input means 26, by moving the controller 22 and transmitting information, obtained by the acceleration sensor and the imaging means, from the controller 22 to the game apparatus 12, an image object (player object) can be moved in a different direction, or a viewpoint (camera position) of the user in a 3D game world can be changed.

Figure 2:
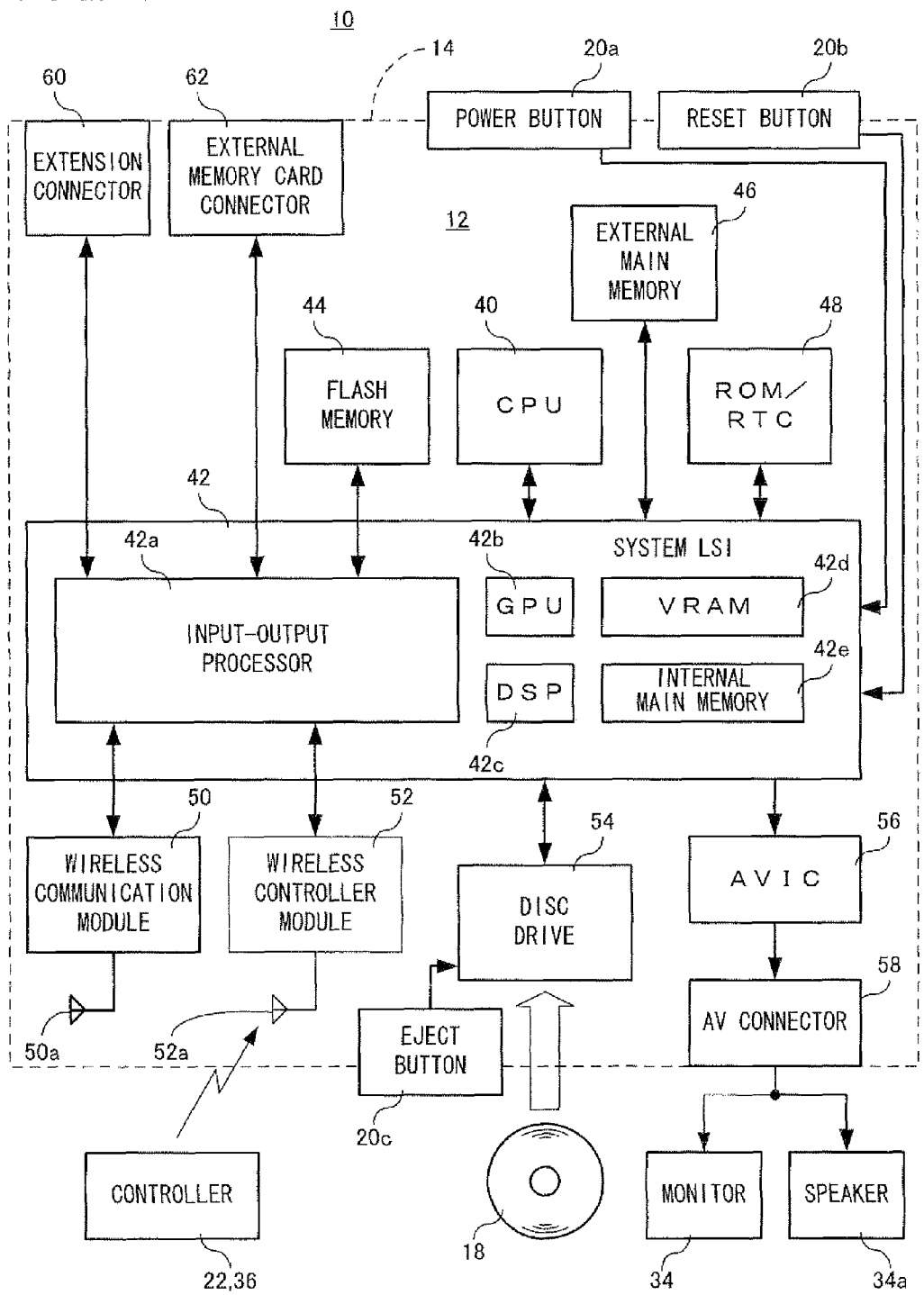
FIG. 2 is a block diagram showing an example of an electrical configuration of the game system.

FIG. 2 is a block diagram showing an electrical configuration of the game system 10. Although not shown in the drawings, each component in the housing 14 is mounted on a printed circuit board. As shown in FIG. 2, the game apparatus 12 is provided with a CPU 40. The CPU 40 functions as a game processor. The CPU 40 is connected to a system LSI 42. The system LSI 42 is connected to an external main memory 46, a ROM/RTC 48, the disc drive 54, and an AVTCS 56.

The external main memory 46 stores a program, such as a game program and the like, and various data, and is used as a work area and a buffer area for the CPU 40. The ROM/RTC 48 includes a ROM (so-called boot ROM) that stores a program for starting up the game apparatus 12; and a clock circuit for counting time. The disc drive 54 reads program data and texture data from the optical disc 18, and writes these data into a later-described internal main memory 42e or the external main memory 46 under the control of the CPU 40.

The system LSI 42 is provided with an input-output processor (I/O process) 42a, a GPU (Graphics Processor Unit) 42b, a DSP (Digital Signal Processor) 42c, a VRAM 42d, and the internal main memory 42e. Although not shown in the drawings, these components are connected to each other through an internal bus.

The input-output processor 42a performs transmission and reception of data to and from each component connected to the input-output processor 42a, and downloads data. The transmission and reception of data and the download of data will be described in detail later.

The GPU 42b forms a part of drawing means, receives a graphics command (command for generating graphics) from the CPU 40, and generates an image according to the graphics command. In addition to the graphics command, the CPU 40 provides the GPU 42b with an image generation program required for generating game image data.

Although not shown in the drawings, the VRAM 42d is connected to the GPU 42b as described above. Prior to executing the graphics command, the GPU 42b accesses the VRAM 42d and obtains required data (image data: data such as polygon data, texture data, and the like). The CPU 40 writes image data, required for drawing an image, into the VRAM 42d through the CPU 42b. The GPU 42b accesses the VRAM 42d and generates game image data for drawing an image.

The present embodiment describes a case where the CPU 42b generates game image data. However, in a case of executing an arbitrary application other than the game application, the CPU 42b generates image data for the arbitrary application.

Further, the DSP 42c functions as an audio processor, and generates audio data, which correspond to sound, voice, and music outputted from the speakers 34a, by using sound data and sound waveform (tone color) data which are stored in the internal main memory 42e and the external main memory 46.

The image data and the audio data generated thus are read by the AVIC 56. The AVIC 56 outputs the image data and the audio data to the monitor 34 and the speakers 34a, respectively, through the AV connector 58. Thus, a game image is displayed on the monitor 34, and sound (music) required for the game is outputted from the speakers 34a.

Further, the input-output processor 42a is connected to a flash memory 44, a wireless communication module 50, a wireless controller module 52, an extension connector 60, and the external memory card connector 62. The wireless communication module 50 is connected to an antenna 50a, and the wireless controller module 52 is connected to an antenna 52a.

The input-output processor 42a is capable of communicating with another game apparatus connected to a network and various servers connected to the network, through the wireless communication module 50. However, the input-output processor 42a is capable of communicating directly with the other game apparatus, not through the network. The input-output processor 42a periodically accesses the flash memory 44 to detect whether or not there is data (referred to as transmission data) required to be transmitted to the network. If there is the transmission data, the input-output processor 42a transmits the transmission data to the network through the wireless communication module 50 and the antenna 50a. The input-output processor 42a receives data (referred to as reception data) transmitted from the other game apparatus through the network, the antenna 50a, and the wireless communication module 50, and stores the reception data in the flash memory 44. In a predetermined case, the input-output processor 42a discards the reception data. In addition, the input-output processor 42a receives data downloaded from a download server through the network, the antenna 50a, and the wireless communication module 50, and stores the downloaded data in the flash memory 44.

Further, the input-output processor 42a receives input data transmitted from the controller 22 and the load controller 36 through the antenna 52a and the wireless controller module 52, and stores (temporarily stores) the input data in the buffer area of the internal main memory 42e or the external main memory 46. The input data in the buffer area is deleted after being used by a game process executed by the CPU 40.

In the present embodiment, as described above, the wireless controller module 52 communicates with the controller 22 and the load controller 36 in accordance with the Bluetooth standard.

For convenience's sake, the controller 22 and the load controller 36 are shown together as one unit in FIG. 2.

The input-output processor 42a is connected to the extension connector 60 and the external memory card connector 62. The extension connector 60 is a connector for an interface such as a USB and an SCSI, and enables connection of a medium such as an external storage medium and connection of a peripheral apparatus such as another controller. Further, instead of the wireless communication module 50, a wired LAN can be used by connecting a wired LAN adapter to the extension connector 60. To the external memory card connector 62, an external storage medium such as a memory card can be connected. Thus, for example, the input-output processor 42a is capable of accessing the external storage medium through the extension connector 60 or the external memory card connector 62 for storing data in the external storage medium and reading data from the external storage medium.

Although not described in detail, the game apparatus 12 (housing 14) is provided with the power button 20a, the reset button 20b, and the eject button 20c as shown in FIG. 1. The power button 20a is connected to the system LSI 42. When the power button 20a is turned on, electric power is supplied to each component of the game apparatus 12 through the AC adapter (not shown), and the system LSI 42 becomes a normal energized mode (referred to as "normal mode"). On the other hand, when the power button 20a is turned off, electric power is supplied to only some components of the game apparatus 12, and the system LSI 42 sets a mode (hereinafter, referred to as "standby mode") that minimizes power consumption. In the present embodiment, when the standby mode is set, the system LSI 42 performs an instruction to stop supplying electric power to components other than the input-output processor 42a, the flash memory 44, the external main memory 46, the ROM/RTC 48, the wireless communication module 50, and the wireless controller module 52. Thus, the standby mode is a mode in which the CPU 40 does not execute an application.

Even in the standby mode, electric power is supplied to the system LSI 42, but, a supply of electric power to the GPU 42b, the DSP 42c, and the VRAM 42d is stopped so as not to drive them, thereby reducing the power consumption.

Further, although not shown in the drawings, a fan is provided in the housing 14 of the game apparatus 12 for discharging heat of the CPU 40, the system LSI 42, and the like. In the standby mode, the fan is stopped.

When the standby mode is not desired to be used, settings are made so as not to use the standby mode, whereby a supply of electric power to all the circuit components is stopped when the power button 20a is turned off.

Further, switching between the normal mode and the standby mode can be performed by means of remote operation such as by turning on/off a power switch of the controller 22. In the case where the remote operation is not performed, in the standby mode, settings may be made so as not to supply electric power to the wireless controller module 52.

The reset button 20b is also connected to the system LSI 42. When the reset button 20b is pressed, the system LSI 42 restarts a boot program of the game apparatus 12. The eject button 20c is connected to the disc drive 54. When the eject button 20c is pressed, the optical disc 18 is ejected from the disc drive 54.

(Load Controller)

Figure 3:
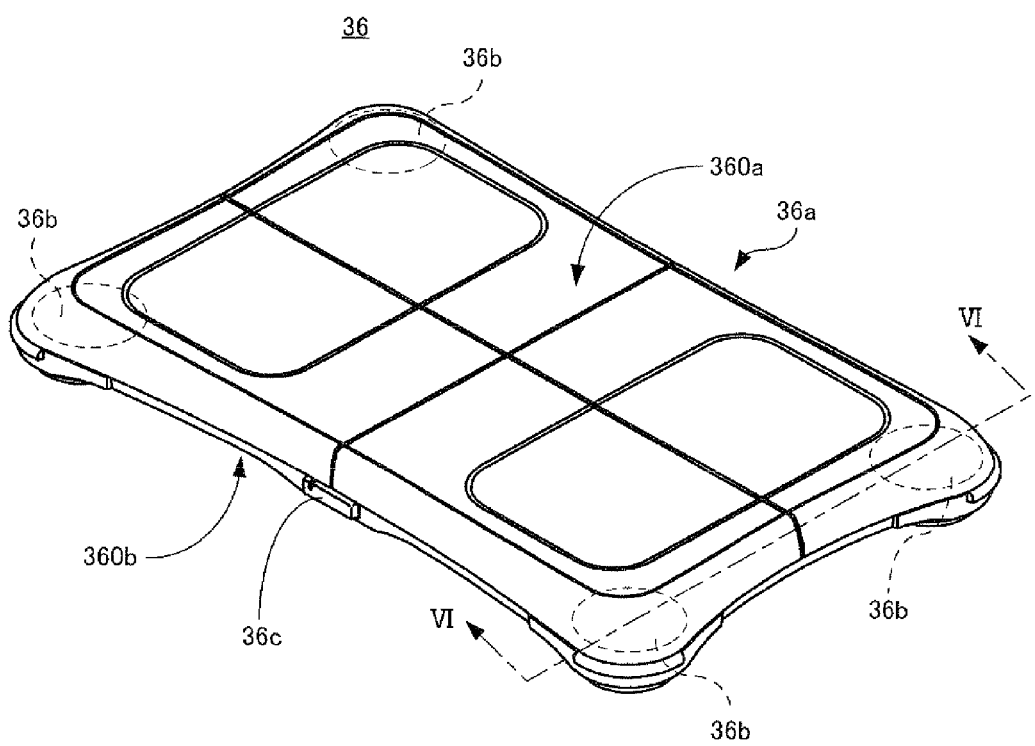
FIG. 3 is a perspective view of a load controller.

FIG. 3 is a perspective external view of the load controller 36 shown in FIG. 1. As shown in FIG. 3, the load controller 36 includes a stand 36a on which the player stands (on which the player puts his or her feet), and four load sensors 36b for detecting a load exerted on the stand 36a. Each load sensor 36b is contained in the stand 36a (see FIG. 5), and their locations are shown by dotted lines in FIG. 3.

The stand 36a is formed in a generally parallelepiped shape, and has a generally rectangular shape in top view. For example, the short side of the rectangle is set to about 30 cm, and the long side thereof is set to about 50 cm. The stand 36a has a flat top surface on which the player stands. The stand 36a has at four corners thereof side surfaces that are formed so as to partially project to have a cylindrical shape.

In the stand 36a, the four load sensors 36b are disposed at predetermined intervals. In the present embodiment, the four load sensors 36b are disposed at the periphery of the stand 36a, specifically, at the four corners thereof, respectively. The intervals among the load sensors 36b are set appropriately such that the load sensors 36b can accurately detect the intention of a game operation which is expressed by a manner of exerting a load on the stand 36a by the player.

Figure 4:
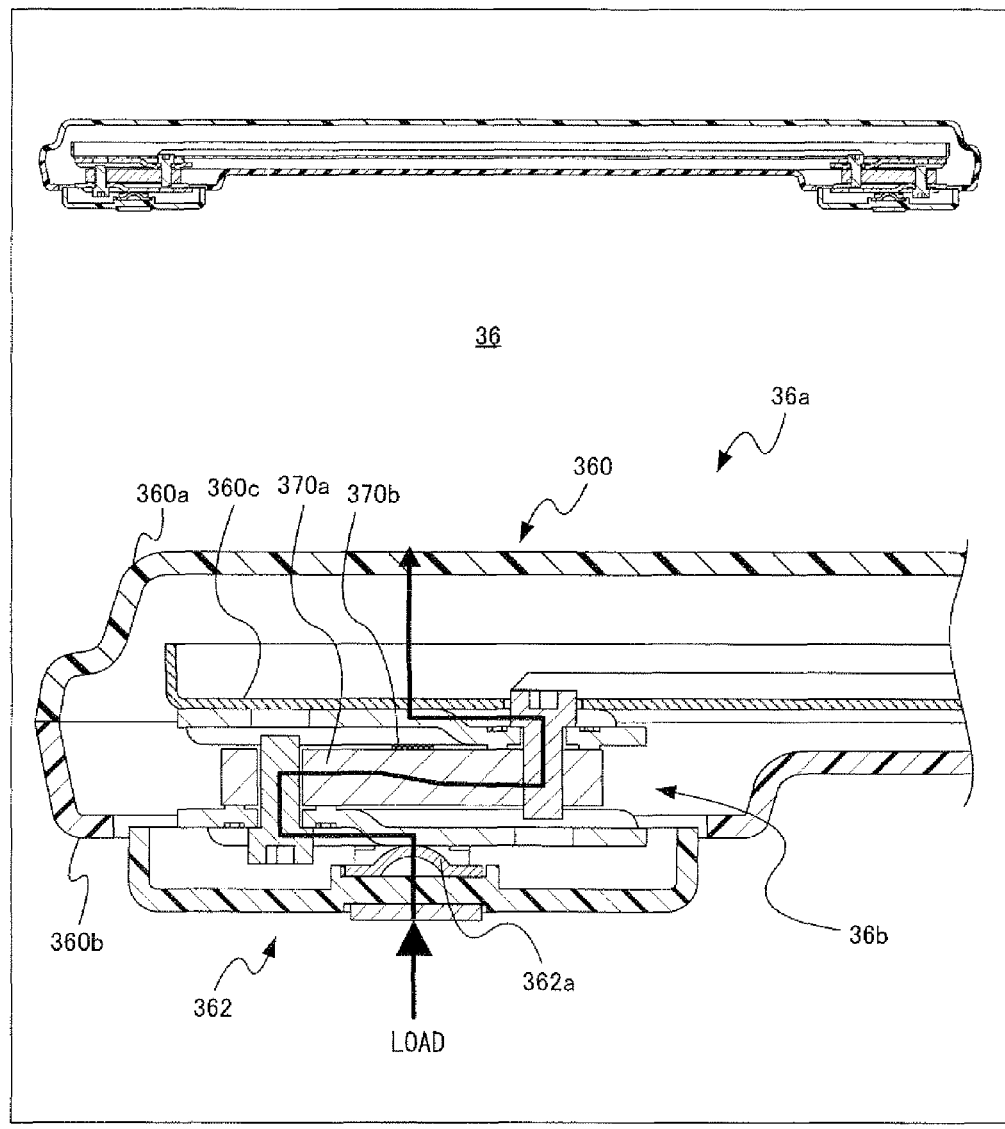
FIG. 4 is a cross-sectional view of the load controller taken along the VI-VI line in FIG. 3.

FIG. 4 shows a cross-sectional view of the load controller 36 taken along the VI-VI line in FIG. 3 and an enlarged view of a portion of the load controller 36 where the load sensor 36b is disposed. As is clear from FIG. 4, the stand 36a includes a support plate 360 on which the player stands, and legs 362. The legs 362 are provided at the positions where the load sensors 36b are disposed. In the present embodiment, because the four load sensors 36b are respectively disposed at the four corners, four legs 362 are provided. The legs 362 are formed in a generally cylindrical shape with a bottom, for example, by plastic molding. The load sensors 36b are respectively disposed on hemispherical parts 362a provided on the bottom surfaces in the legs 362. The support plate 360 is supported by the legs 362 through the load sensors 36b.

The support plate 360 includes an upper plate 360a that forms the top surface and a side surface upper portion, a lower plate 360b that forms a bottom surface and a side surface lower portion, and a mid plate 360c provided between the upper plate 360a and the lower plate 360b. The upper plate 360a and the lower plate 360b are formed, for example, by plastic molding, and integrated with each other by means of adhesion. The mid plate 360c is formed, for example, from one metallic plate by press molding. The mid plate 360c is fixed on the four load sensors 36b. The upper plate 360a has a grid-shaped rib (not shown) on the lower surface thereof, and is supported on the mid plate 360c through the rib. Thus, when the player stands on the stand 36a, the load is transmitted through the support plate 360, the load sensors 36b, and the legs 362. As shown by arrows in FIG. 4, the reaction from a floor, occurring by the exerted load, is transmitted to the upper plate 360a through the legs 362, the hemispherical parts 362a, the load sensors 36b, and the mid plate 360c.

The load sensors 36b are load converters that convert inputted loads into electric signals, for example, strain gauges (strain sensors) type load cells. In each load sensor 36b, according to the inputted load, a strain-generating body 370a deforms to generate strain. The strain is converted into a change of electric resistance by a strain sensor 370b attached to the strain-generating body 370a, and further converted into a voltage change. Thus, each load sensor 36b outputs a voltage signal indicative of the inputted load, from its output terminal.

Each load sensor 36b may be a load sensor of another type, such as a tuning fork vibration type, a string vibration type, an electrostatic capacitance type, a piezoelectric type, a magnetic strain type, and a gyro type.

Referring back to FIG. 3, the load controller 36 is provided with a power button 36c. When the power button 36c is turned on, electric power is supplied to each circuit component (see FIG. 5) of the load controller 36. It is noted that the load controller 36 may be turned on in accordance with an instruction from the game apparatus 12. When a state where the player does not stand on the load controller 36 continues for a certain time period (e.g. 30 seconds), the load controller 36 is turned off. However, when the power button 36c is pressed in a state where the load controller 36 is on, the load controller 36 may be turned off.

FIG. 5 is a block diagram showing an example of an electrical configuration of the load controller 36. In FIG. 5, flows of signals and communication are indicated by solid arrows. Dotted arrows indicate supply of electric power.

The load controller 36 includes a microcomputer 100 for controlling the operation of the load controller 36. The microcomputer 100 includes a CPU, a ROM, a RAM, and the like, which are not shown in the drawings. The CPU controls the operation of the load controller 36 in accordance with a program stored in the ROM.

The microcomputer 100 is connected to the power button 36c, an AD converter 102, a DC-DC converter 104, and a wireless module 106. The wireless module 106 is connected to an antenna 106a. The four load sensors 36b are connected to the AD converter 102 through respective amplifiers 108.

Further, a battery 110 is contained in the load controller 36 for supplying electric power. In an alternative embodiment, instead of the battery, an AC adapter may be connected to the load controller 36 for supplying commercial power thereto. In this case, instead of the DC-DC converter, a power circuit, which converts alternating current into direct current and lowers and rectifies a direct current voltage, needs to be provided. In the present embodiment, electric power is supplied directly from the battery to the microcomputer 100 and the wireless module 106. In other words, the electric power is always supplied to the wireless module 106 and some components (the CPU) in the microcomputer 100 to detect whether or not the power button 36c is turned on and whether or not a command for turning on the power (load detection) is transmitted from the game apparatus 12. Meanwhile, the electric power is supplied from the battery 110 through the DC-DC converter 104 to the load sensors 36b, the AD converter 102, the amplifiers 108, and the battery 110. The DC-DC converter 104 converts a voltage value of direct current from the battery 110 into a different voltage value, and provides the resultant direct current to the load sensors 36b, the AD converter 102, and the amplifiers 108.

A supply of electric power to the load sensors 36b, the AD converter 102, and the amplifiers 108 may be conducted according to need by controlling the DC-DC converter 104 by the microcomputer 100. In other words, when it is determined that the load sensors 36b need to be activated to detect loads, the microcomputer 100 may control the DC-DC converter 104 so as to supply electric power to the load sensors 36b, the AD converter 102, and the amplifiers 108.

When the electric power is supplied, each load sensor 36b outputs a signal indicative of the inputted load. The signal is amplified by the corresponding amplifier 108, converted from the analog signal into digital data by the AD converter 102, and inputted to the microcomputer 100. Identification information of each load sensor 36bA is assigned to a detection value of each load sensor 36b such that it is possible to identify by which load sensor 36b the detection value is detected. As described above, the microcomputer 100 can obtain data indicative of each load detection value of the four load sensors 36b at the same time.

On the other hand, when it is determined that the load sensors 36b do not need to be activated, namely, that it is not a timing of load detection, the microcomputer 100 controls the DC-DC converter 104 so as to stop the supply of electric power to the load sensors 36b, the AD converter 102, and the amplifiers 108. As described above, in the load controller 36, because the load sensors 36b are activated to detect loads only when necessary, power consumption for load detection can be reduced.

A time when load detection is needed is typically a time when the game apparatus 12 (see FIG. 1) desires to obtain load data. For example, when the game apparatus 12 requires load information, the game apparatus 12 transmits a load obtaining command to the load controller 36. Upon receiving the load obtaining command from the game apparatus 12, the microcomputer 100 controls the DC-DC converter 104 so as to supply electric power to the load sensors 36b and the like for detecting loads. On the other hand, when not receiving a load obtaining command from the game apparatus 12, the microcomputer 100 controls the DC-DC converter 104 so as to stop the supply of electric power.

Alternatively, the microcomputer 100 may determine a timing of load detection every constant time period, and control the DC-DC converter 104. When such periodical load detection is conducted, information regarding the constant time period may be initially provided from the game apparatus 12 to the microcomputer 100 of the load controller 36 and stored therein, or may be stored in the microcomputer 100 in advance.

Data indicative of the detection values from the load sensors 36b is transmitted as operation data (input data) of the load controller 36 from the microcomputer 100 to the game apparatus 12 (see FIG. 1) through the wireless module 106 and the antenna 106a. For example, in the case of performing load detection according to a command from the game apparatus 12, when the microcomputer 100 receives the detection value data of the load sensors 36b from the AD converter 102, the microcomputer 100 transmits the detection value data to the game apparatus 12. Alternatively, the microcomputer 100 may transmit the detection value data to the game apparatus 12 every constant time period. When the interval of the load detection is longer than the interval of the transmission, data including load values detected at a plurality of detection timings until a transmission timing is transmitted.

It is noted that the wireless module 106 is set so as to perform communication according to the same wireless standard (the Bluetooth, a wireless LAN, and the like) as that for the wireless controller module 52 of the game apparatus 12. Thus, the CPU 40 of the game apparatus 12 is capable of transmitting a load obtaining command to the load controller 36 through the wireless controller module 52 and the like. The microcomputer 100 of the load controller 36 is capable of receiving the command from the game apparatus 12 through the wireless module 106 and the antenna 106a, and transmitting input data including a load detection value (or a load calculation value) of each load sensor 36b to the game apparatus 12.

In the case of a game executed based on the total of four load values detected by the four load sensors 36b, the player can stand at any position on the load controller 36 with respect to the four load sensors 36b, in other words, the player can play the game while standing at any position on the stand 36a and in any facing direction. However, depending on types of games, a process need to be executed while identifying which direction a load value detected by each load sensor 36b comes from with respect to the player, namely, it is necessary to know the positional relation between the four load sensors 36b of the load controller 36 and the player. In this case, for example, a positional relation between the four load sensors 36b and the player may be defined in advance, and it may be postulated that the player stands on the stand 36a so as to meet this predetermined positional relation. Typically, a positional relation in which two load sensors 36b are present on each of right and left sides or each of front and rear sides of the player standing at the center of the stand 36a, namely, a positional relation in which, when the player stands at the center of the stand 36a of the load controller 36, the load sensors 36b are present in the front right direction, the front left direction, the rear right direction, and the rear left direction from the player, respectively, is defined. In this case, in the present embodiment, because the stand 36a of the load controller 36 is formed in a rectangular shape in plan view and the power button 36c is provided at one side (long side) of the rectangle, it is defined in advance, using the power button 36c as a mark, that the player stands on the stand 36a such that the long side at which the power button 36c is provided is present in a predetermined direction (front, rear, left, or right) from the player. By doing so, a load value detected by each load sensor 36b becomes a load value in a predetermined direction (right front, left front, right rear, and left rear) from the player. Thus, the load controller 36 and the game apparatus 12 can identify which direction from the player each load detection value corresponds to, based on the identification information of each load sensor 36b which is included in the load detection value data and preset (prestored) position data indicative of a direction from the player to each load sensor 36b. Accordingly, it is possible to know the intention of a game operation, such as operation directions of front, rear, left, and right, which is expressed by the player.

The position of each load sensor 36b with respect to the player may not be defined in advance, and may be set by an input performed by the player at initial setting or at setting during a game. For example, the positional relation of each load sensor 36b with respect to the player can be specified by displaying an image for instructing the player to stand on a portion present in a predetermined direction (left front, right front, left rear, or right rear) from the player is displayed; and obtaining load values. Position data obtained by this setting may be generated and stored. Alternatively, a screen for selecting a position on the load controller 36 may be displayed on the monitor 34, and the player may be made to select in which direction from the player a mark (the power button 36c) is present, by an input with the controller 22. In accordance with this selection, position data of each load sensor 36b may be generated and stored.

(Game Play)

Figure 6:
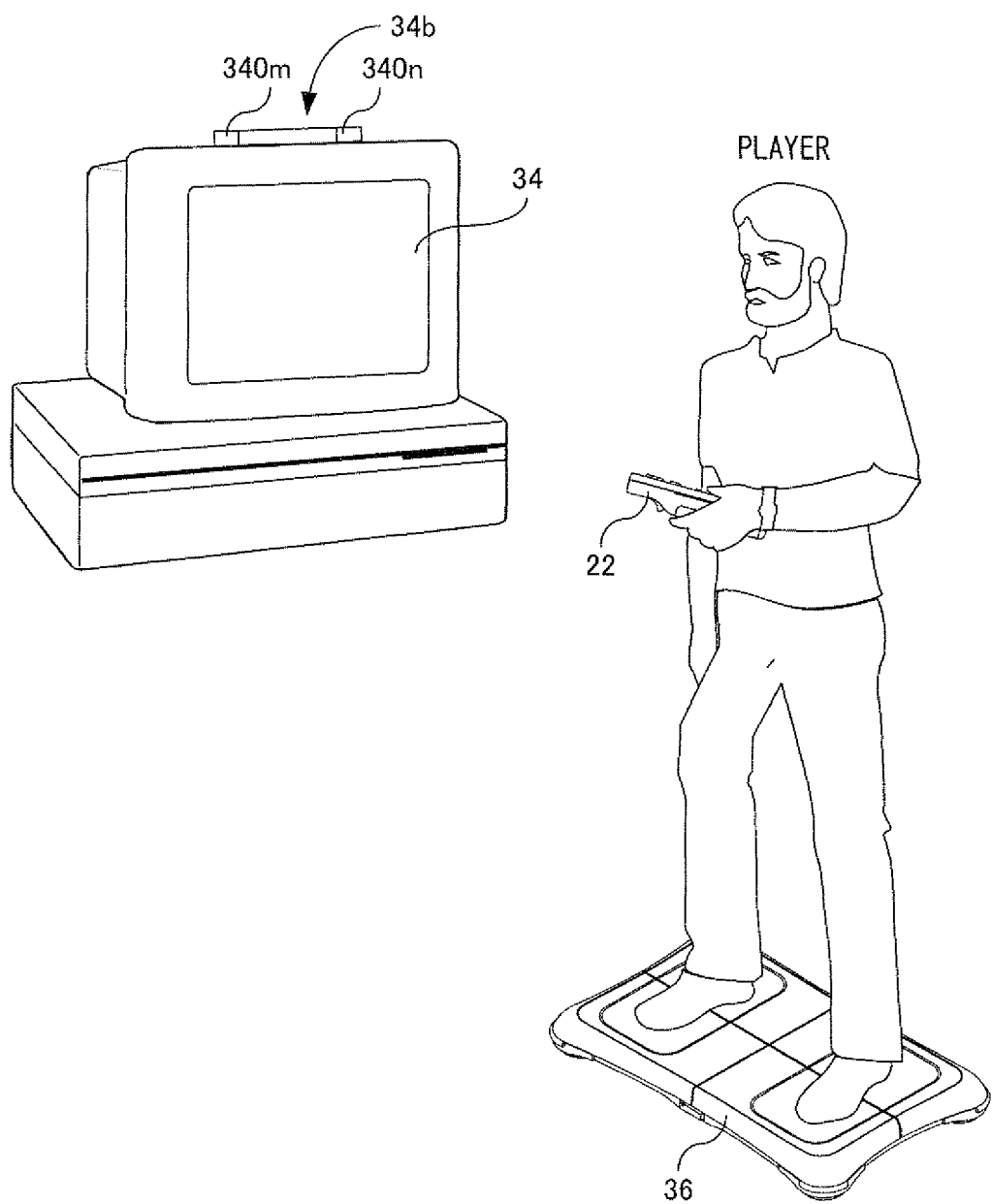
FIG. 6 is a view illustrating a state when a game is played by using a controller and the load controller.

FIG. 6 illustrates a state when a game is played by using the controller 22 and the load controller 36. As shown in FIG. 6, when a game is played with the game system 10 by using the controller 22 and the load controller 36, the player stands on the load controller 36 and holds the controller 22 with one hand.

FIG. 6 shows the case when the load controller 36 is placed lengthwise with respect to the screen of the monitor 34 (such that the long side direction thereof points toward the screen) and the player's right shoulder faces the screen of the monitors 34. However, the orientation of the load controller 36 with respect to the screen of the monitor 34 and the facing direction of the player can be changed as appropriate depending on types of games, and, for example, the load controller 36 may be oriented crosswise with respect to the screen of the monitor 34 (such that the long side direction thereof is parallel to the screen of the monitor 34) and the player faces the screen.

The following will describe an operation of the game apparatus 12 when the video game is executed by the game system 10.

The video game executed by the game system 10 in the present embodiment may be realized, for example, by application software (an exercise support program) for enabling the user to do various exercises (training, a workout, and the like) using the game system 10. In this case, the game apparatus 12 including the CPU 40 executing the exercise support program serves as an exercise support apparatus.

Figure 7:
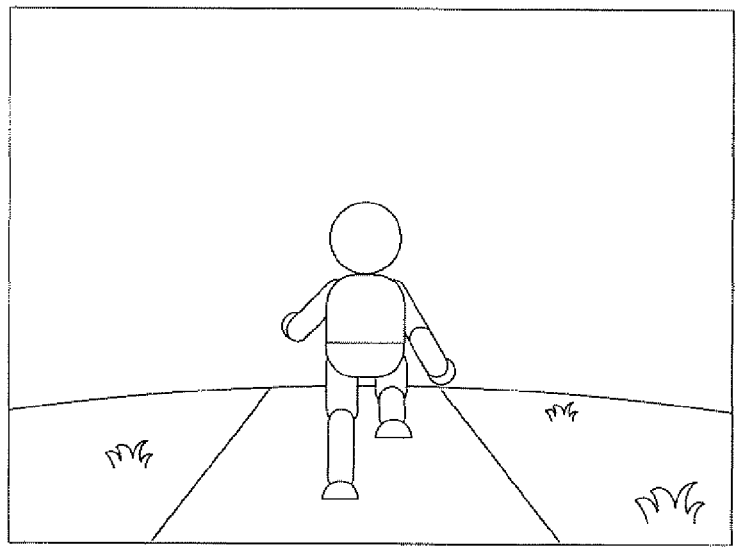
FIG. 7 illustrates an exemplary game image of a video game.

FIG. 7 illustrates a game image displayed on the screen of the monitor 34 during execution of the video game. In the video game, the player holding the controller 22 stands on the load controller 36 and plays the game.

On the screen of the monitor 34, a virtual game space including a character (object) operated by the player is displayed. When the player performs stepping on the load controller 36 (i.e. alternately stands on the right foot and the left foot), the character walks in conjunction with this stepping. Specifically, when the player stands on the right foot on the load controller (i.e. moves their gravity center position rightward), the character steps forward with the right foot. When the player stands on the left foot on the load controller 36 (i.e. moves their gravity center position leftward), the character steps forward with the left foot. Thus, the player can operate the character in the virtual game space as if actually walking.

The following will describe in detail a method of controlling walking motion of the character based on signals from the load controller 36.

Figure 8:
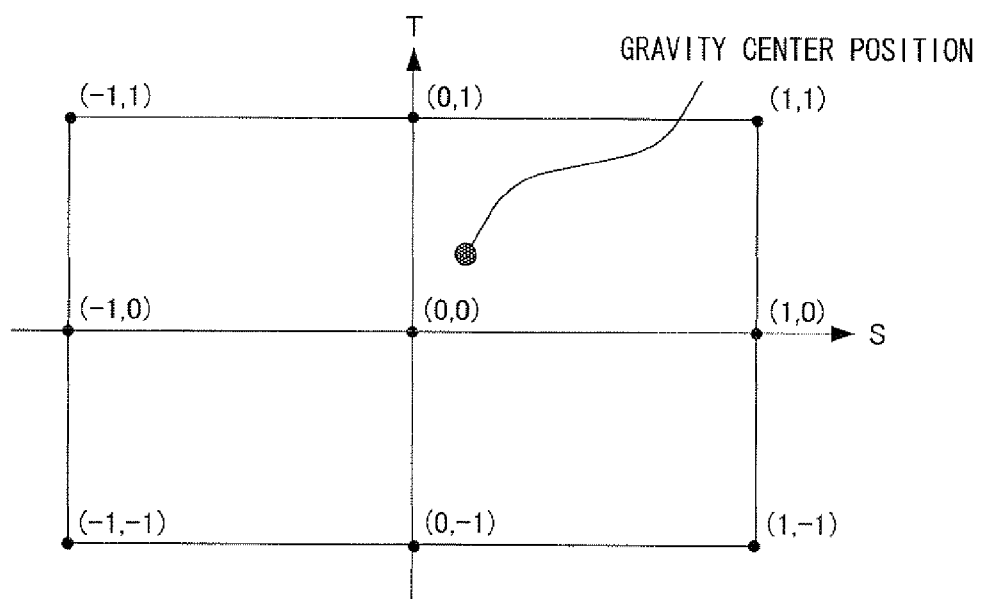
FIG. 8 illustrates an example of a gravity center position calculated based on a signal from the load controller.

FIG. 8 illustrates an example of a gravity center position calculated based on a signal from the load controller 36. The gravity center position of the player is represented by an S coordinate value and a T coordinate value. The origin of an ST coordinate space corresponds to the center of the stand 36a of the load controller 36. Further, an S axis positive direction corresponds to the direction from the left edge of the load controller 36 (the edge on the left side when viewed from the player standing behind the load controller 36 so as to face the long side on which the power button 36c is provided) toward the right edge of the load controller 36, and a T axis positive direction corresponds to the direction from the rear edge toward the front edge of the load controller 36.

The above gravity center position of the player is calculated based on four load values detected by the four load sensors 36b provided in the load controller 36. Specifically, on the assumption that the player stands on the stand 36a of the load controller 36 such that the power button 36c is positioned behind the player, the S coordinate (s0) and the T coordinate (t0) of the gravity center are calculated by the following mathematical formulas, respectively, where: a denotes the load value of the load sensor 36b positioned on the right rear side of the player; b denotes the load value of the load sensor 36b positioned on the left rear side of the player; c denotes the load value of the load sensor 36b positioned on the right front side of the player; and d denotes the load value of the load sensor 36b positioned on the left front side of the player.

$$s0 = ((a+c)-(b+d)) * m$$

$$t0 = ((c+d)-(a+b)) * n$$

Here, m and n are constants, and s0 and t0 satisfy that −1≤s0≤1 and −1≤t0≤1, respectively. As described above, s0 is calculated based on the difference between the sum of the load values of the two load sensors 36b positioned on the left side of the player and the sum of the load values of the two load sensors 36b positioned on the right side of the player. Similarly, t0 is calculated based on the difference between the sum of the load values of the two load sensors 36b positioned on the front side of the player and the sum of the load values of the two load sensors 36b positioned on the rear side of the player.

Figure 9:
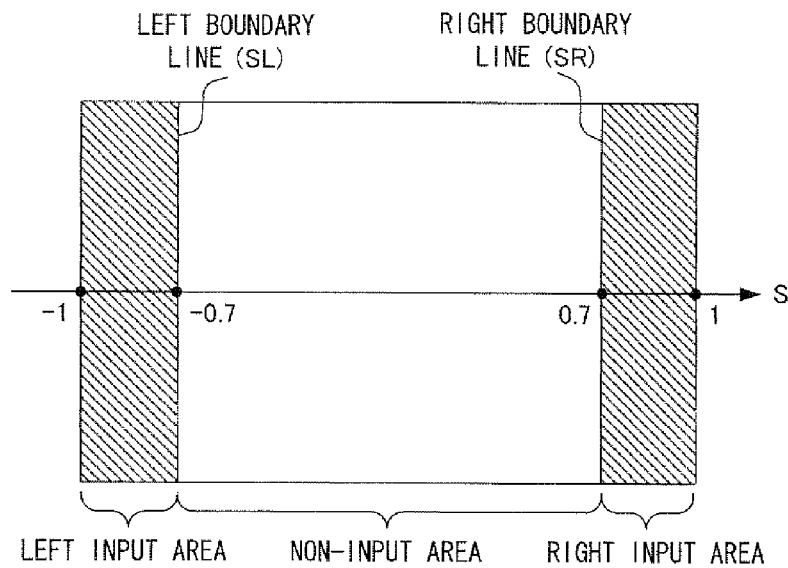
FIG. 9 shows an example of areas set in an ST coordinate space.
Figure 10:
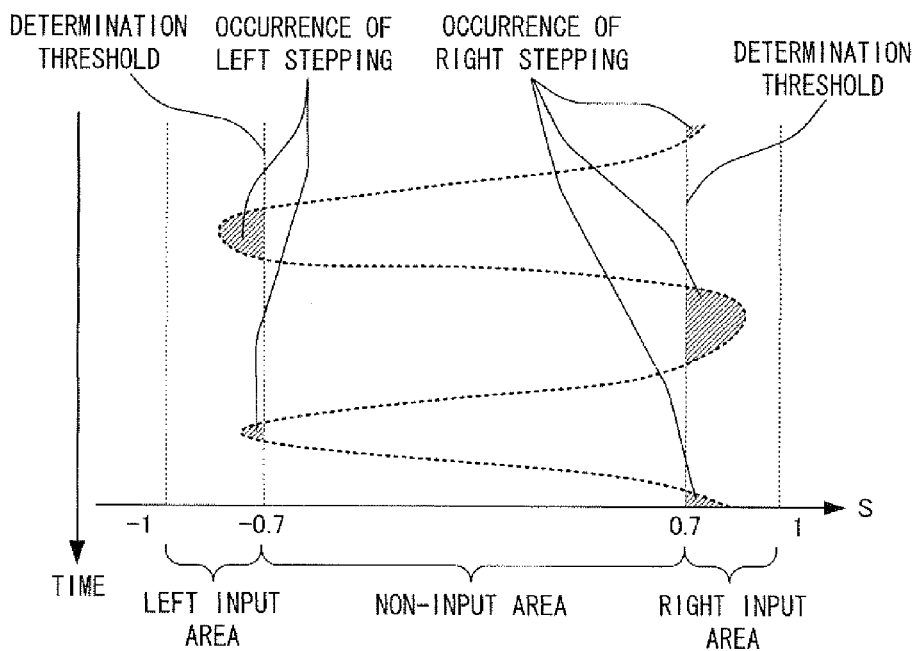
FIG. 10 is a view for explaining a first input determination process.

With reference to FIGS. 9 and 10, the following will describe an input determination process based on the gravity center position of the player.

The control of the walking motion of the character based on signals from the load controller 36 is performed by using only the S coordinate value (s0) of the gravity center position of the player detected as described above.

As shown in FIG. 9, a left input area, a non-input area, and a right input area are set in the ST coordinate space. The non-input area is a position such that, when the gravity center position of the player is located in this area, it is determined that the player has not intentionally moved their gravity center. In other words, when the gravity center position of the player is located in the non-input area, it is determined that the player has not intentionally moved their gravity center. On the other hand, when the gravity center position of the player is located off the non-input area (i.e. the gravity center position of the player is located in the left input area or in the right input area), it is determined that the player has intentionally moved their gravity center.

In the present embodiment, the left input area, the non-input area, and the right input area are set only based on S coordinate values, respectively. Specifically, as shown in FIG. 9 as an example, the boundary line between the non-input area and the left input area (hereinafter, referred to as left boundary line SL) is a straight line having an S coordinate value of −0.7, and the boundary line between the non-input area and the right input area (hereinafter, referred to as right boundary line SR) is a straight line having an S coordinate value of 0.7.

FIG. 10 is a figure, in which a horizontal axis is an S coordinate axis and a vertical axis is a temporal axis, and which shows an example of a shift of the gravity center position of the player in the S axis direction. As shown in FIG. 10, when the gravity center position enters the right input area, it is determined that a step has been taken with the right foot, and the character in the virtual game space steps forward by taking a step with the right foot accordingly. When the gravity center position enters the left input area, it is determined that a step has been taken with the left foot, and the character in the virtual game space steps forward by taking a step with the left foot accordingly. Specifically, the S coordinate value is compared with thresholds of ±0.7. When the S coordinate value of the gravity center position is equal to or greater than 0.7, it is determined that a step has been taken with the right foot. When the S coordinate value of the gravity center position is equal to or less than −0.7, it is determined that a step has been taken with the left foot.

In the video game, similarly to walking in the real world, the character in the virtual game space is limited not to take a step with the same foot (the right foot or the left foot) consecutively two times or more. Thus, in order to cause the character in the virtual game space to walk, the player needs to cause their gravity center position to alternately enter the right input area and the left input area.

This is the explanation of a first input determination process in the present embodiment.

Figure 11:
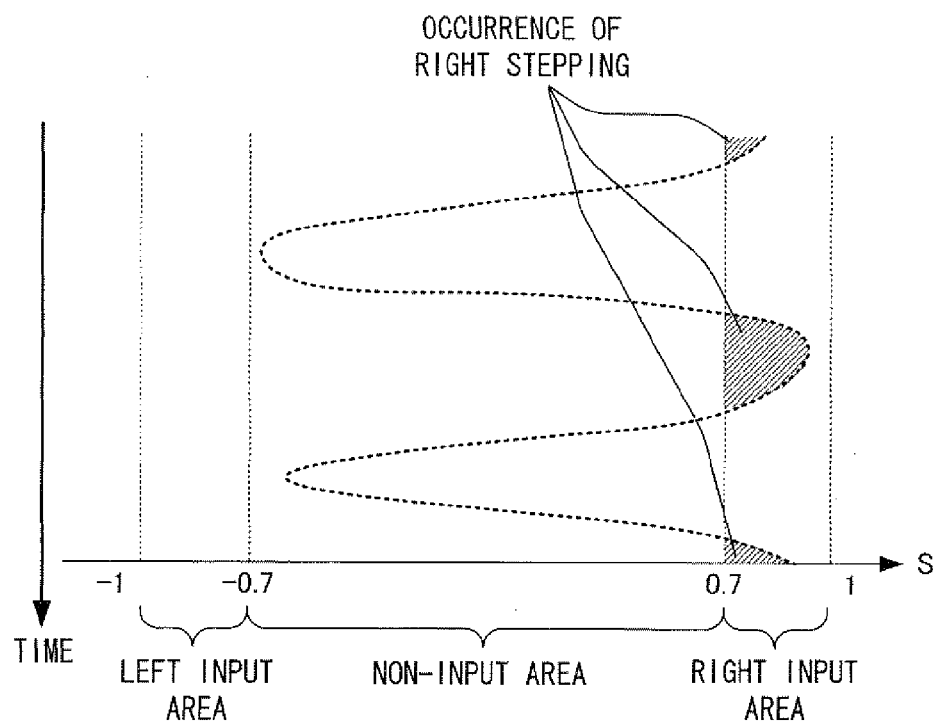
FIG. 11 shows an example of a shift of a gravity center position.

Only with the above first input determination process, there is a case where the character is not caused to walk successfully when the player takes steps at a biased position on the load controller 36. FIG. 11 is a figure, in which a horizontal axis is an S coordinate axis and a vertical axis is a temporal axis similarly to FIG. 10, and which shows an example of a shift of the gravity center position of the player when the player takes steps at a biased position (at a position rightward of the center) on the load controller 36. In this case, as shown in FIG. 11, even though the player takes steps, the gravity center position cannot be caused to enter alternately the right input area and the left input area, and hence the character cannot be caused to walk successfully.

Figure 12:
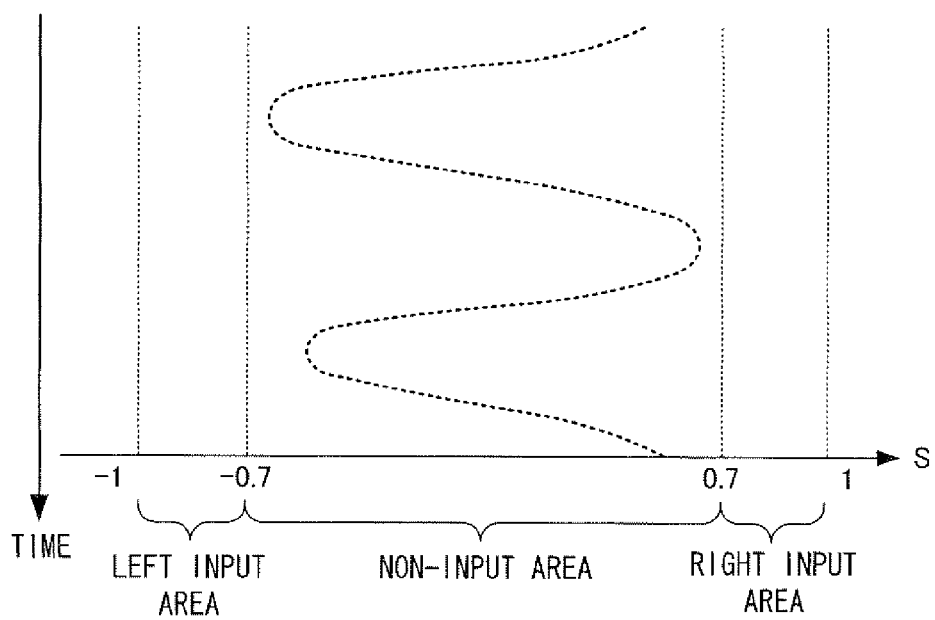
FIG. 12 shows another example of a shift of a gravity center position.

Further, only with the above first input determination process, there is a case where the character is not caused to walk successfully when the player takes steps with the right foot and the left foot on the load controller 36 such that the landing positions of the right foot and the left foot are close to each other. FIG. 12 is a figure, in which a horizontal axis is an S coordinate axis and a vertical axis is a temporal axis similarly to FIG. 11, and which shows an example of a shift of the gravity center position of the player when the player takes steps with the right foot and the left foot on the load controller 36 such that the landing positions of the right foot and the left foot are close to each other. In this case, as shown in FIG. 12, even though the player takes steps, the gravity center position cannot be caused to enter at least either the right input area or the left input area (cannot be caused to enter both the right input area and the left input area in the example of FIG. 12), and hence the character cannot be caused to walk successfully.

Therefore, in the present embodiment, in order for the player to cause the character to walk successfully even in the above situations, a second input determination process is executed in addition to the above first input determination process (or instead of the above first input determination process). The following will describe the second input determination process in detail.

In the second input determination process, whether or not the player performs a stepping operation is determined not only based on the current gravity center position but also by referring to a history of the gravity center position.

Figure 13:
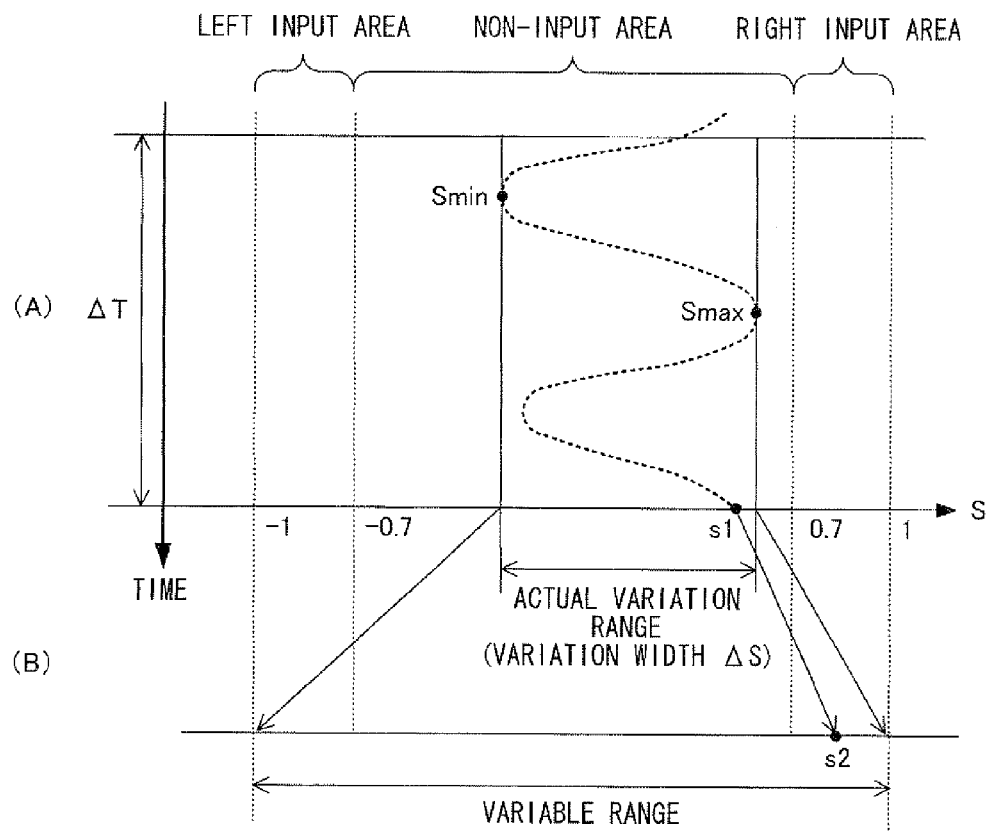
FIG. 13 is a view for explaining a second input determination process.
Figure 14:
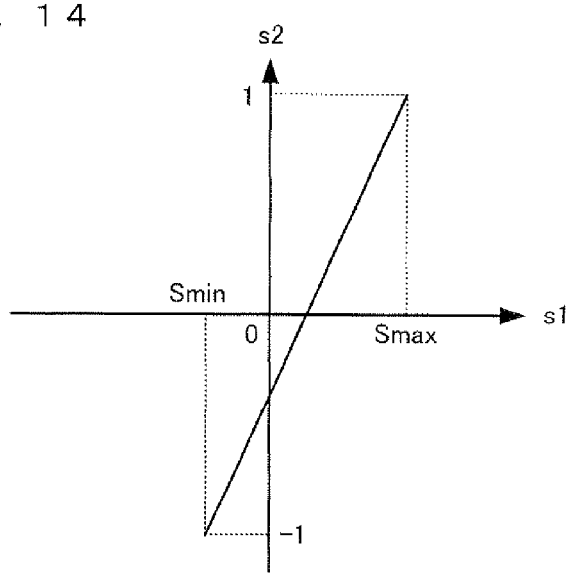
FIG. 14 is a view for showing a method of calculating a corrected gravity center position.

FIG. 13 is a view for explaining a method of the second input determination process in the present embodiment. FIG. 13 is a figure, in which a horizontal axis is an S coordinate axis and a vertical axis is a temporal axis similarly to FIG. 12, and which shows an example of a shift of the gravity center position of the player. In the present embodiment, as shown in FIG. 13(A), a history of the gravity center position during a period (hereinafter, referred to as history period ΔT) to the current time from a past point that is earlier than the current time by a period that is equal to at least a 30-frame period (0.5 sec in the case where game images for 60 frames are generated in 1 second), is always stored in a storage area (e.g., in the external main memory 46). Then, the smallest S coordinate value (hereinafter, referred to as minimum, value Smin) and the greatest S coordinate value (hereinafter, referred to as maximum, value Smax) among the gravity center positions stored as the history, are detected. Next, as shown in FIG. 13(B), in accordance with the minimum value Smin and the maximum value Smax, the latest gravity center position s1 (in other words, a gravity center position that is a target for the input determination process) is corrected. Hereinafter, the gravity center position after correction is referred to as corrected gravity center position S2. The gravity center position s1 can be converted into the corrected gravity center position s2 by using a linear conversion function (see FIG. 14) by which the minimum value Smin and the maximum value Smax, which define the actual variation range of the gravity center position, are converted into the lower limit (−1 in this case) and the upper limit (1 in this case) of a variable range of the gravity center position. The relation between the gravity center position s1 and the corrected gravity center position s2 is represented by the following mathematical formula.

$$s2=\{2/(Smax-Smin)\}*\{s1-(Smax-Smin)/2\}$$

After the corrected gravity center position s2 is calculated as described above, it is determined in which of the left input area, the non-input area, and the right input area, the corrected gravity center position s2 is located. Specifically, similarly as in the aforementioned first input determination process, the corrected gravity center position s2 is compared with thresholds of ±0.7 to perform the determination. Thus, even when the gravity center position shifts, for example, as shown in FIG. 13(A), whether or not the player performs a stepping operation can be accurately determined. This is the explanation of the second input determination process in the present embodiment.

By correcting the gravity center position as described above, the gravity center position is normalized in accordance with the variation range of the gravity center position. Thus, even when the variation range of the gravity center position is located off the desired position as shown in FIG. 11, or even when the width of the variation range of the gravity center position is smaller than the desired width as shown in FIG. 12, a process in accordance with the gravity center position can be appropriately executed.

It is noted that depending on the width (hereinafter, referred to as variation width ΔS) of the variation range of the gravity center position (i.e., the range from the minimum value Smin to the maximum value Smax), the aforementioned second input determination process may be temporarily invalidated (i.e., the second input determination process may be not executed, or the second input determination process may be executed but the result may not be used). For example, even when the player is static on the load controller 36, the gravity center position may slightly vary. The gravity center position detected in this case fluctuates with a relatively small variation width ΔS as shown as an example in FIG. 15. Thus, there may be a case where an erroneous determination of an input occurs even when the player is static. In order to prevent such an erroneous determination, the second input determination process may be invalidated when the variation width ΔS is less than a predetermined threshold (e.g., 0.5). Whereby, an erroneous determination of an input, which can occur when the player does not perform a stepping operation, can be eliminated.

Figure 16:
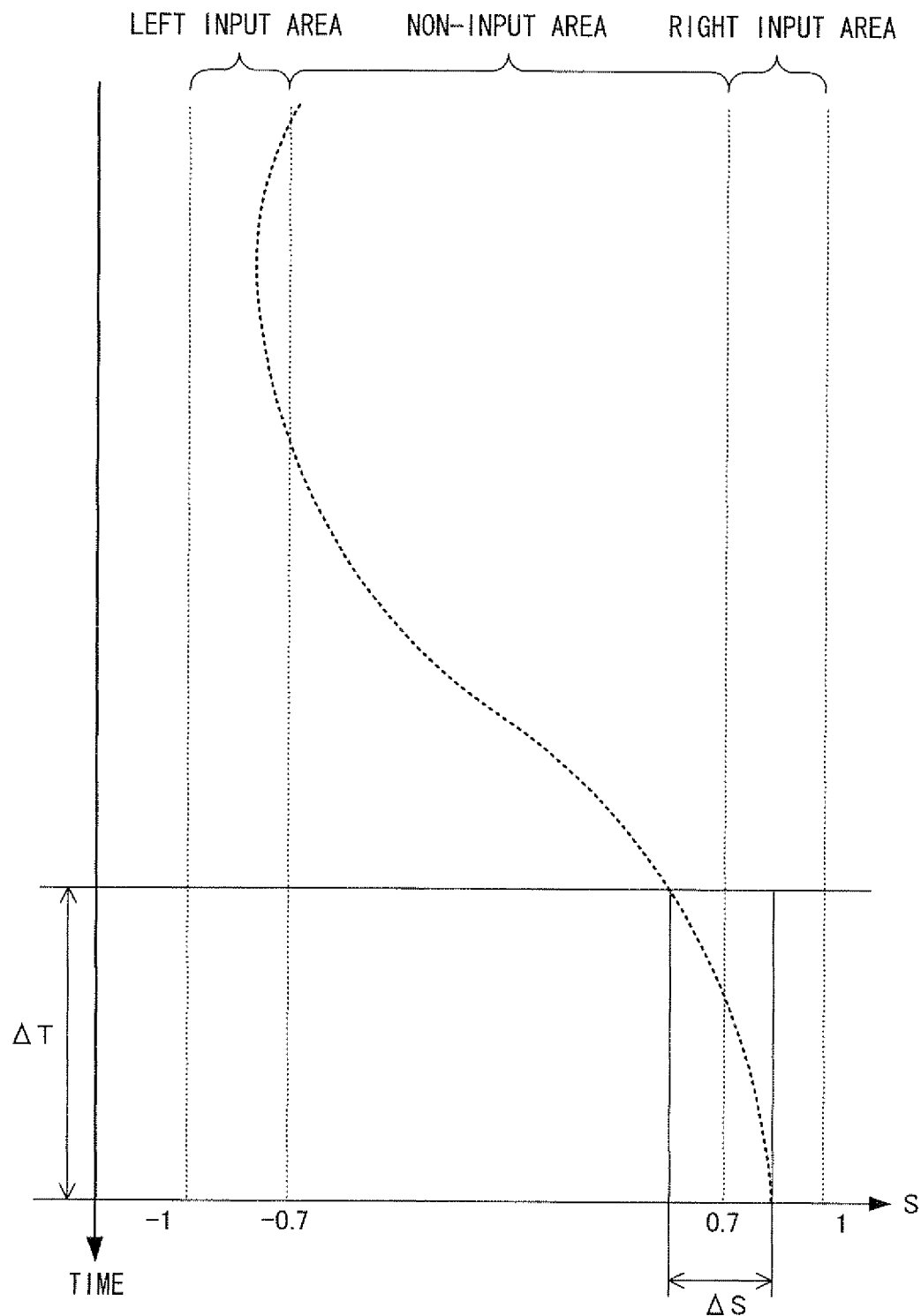
FIG. 16 shows another example of a shift of a gravity center position.

It is noted that when the player takes steps slowly in the case where the variation width ΔS is less than the predetermined threshold as described above, there is the possibility that these steps cannot be detected. FIG. 16 shows an example of a shift of the gravity center position when the player takes steps slowly. When the player takes steps slowly, the gravity center position varies gently as shown in FIG. 16. As a result, the variation width ΔS during the history period ΔT becomes less than the predetermined threshold, and hence the stepping operation of the player cannot be detected by the second input determination process. In order to be able to correctly detect a stepping operation of the player even in such a situation, the stepping operation of the player is preferably detected by the aforementioned first input determination process at least while the second input determination process is invalidated.

Further, the aforementioned second input determination process may be temporarily invalidated depending on the absolute value of the difference between the latest gravity center position s1 and the gravity center position (hereinafter, referred to last-time gravity center position sp) detected immediately before the detection of the latest gravity center position s1, namely, depending on the variation amount of the gravity center position (more commonly, the variation amount of the gravity center position per unit time). FIG. 17 shows an example of a shift of the gravity center position when the player stops taking steps. In the example of FIG. 17, because the player stops taking steps, the minimum value Smin during the history period ΔT gradually increases. As a result, the value of the corrected gravity center position s2 becomes equal to or less than −0.7, and it is erroneously determined that a step has been taken with the left foot. Thus, in order to prevent such an erroneous determination, the second input determination process may be invalidated when the variation amount of the gravity center position is less than a predetermined threshold. Whereby, an erroneous determination, which can occur after the player stops a stepping operation, can be eliminated.

The following will describe a procedure of processing executed by the CPU 40 of the game apparatus 12 in the present embodiment.

Figure 18:
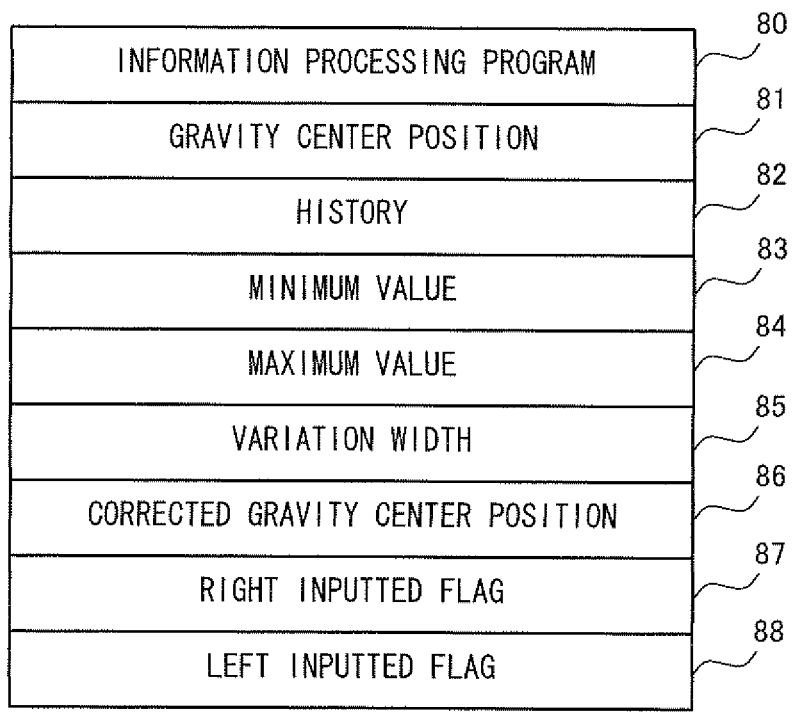
FIG. 18 shows a memory map of an external main memory during execution of a video game.

FIG. 18 shows an example of a computer program and data that are stored in the external main memory 46 in the present embodiment. It is noted that the internal main memory 42e or another memory may be used instead of the external main memory 46.

An information processing program 80 is a computer program that is composed of a plurality of program codes for causing the CPU 40 to execute the video game. Prior to execution of the video game, the information processing program 80 is loaded from a computer-readable storage medium, such as the optical disc 18 and the flash memory 44, and stored in the external main memory 46. It is noted that the information processing program 80 may be supplied to the game apparatus 12 from another computer system (e.g., a game program distribution server, and another game apparatus) via the wireless communication module 50 and the like.

A gravity center position 81 is two-dimensional coordinate data indicative of the gravity center position (latest gravity center position) of the player on the stand 36a of the load controller 36. It is noted that the gravity center position 81 is not necessarily two-dimensional coordinate data, and when only the S coordinate value of the gravity center position is used in the information processing program 80, only the S coordinate value may be stored as the gravity center position 81 in the external main memory 46.

A history 82 is data indicative of the history of the gravity center position during the aforementioned history period ΔT.

A minimum value 83 is data indicative of the minimum value Smin of the gravity center position during the history period ΔT.

A maximum value 84 is data indicative of the maximum value Smax of the gravity center position during the history period ΔT.

A variation width 85 is data indicative of the width (the aforementioned variation width ΔS) of the variation range of the gravity center position during the history period ΔT.

A corrected gravity center position 86 is data indicative of the aforementioned corrected gravity center position s2.

A right inputted flag 87 is a flag that is set to be ON when the gravity center position 81 or the corrected gravity center position 86 enters the right input area, and that is set to be OFF when the gravity center position 81 or the corrected gravity center position 86 enters the left input area.

A left inputted flag 88 is a flag that is set to be ON when the gravity center position 81 or the corrected gravity center position 86 enters the left input area, and that is set to be OFF when the gravity center position 81 or the corrected gravity center position 86 enters the right input area.

Figure 19A:
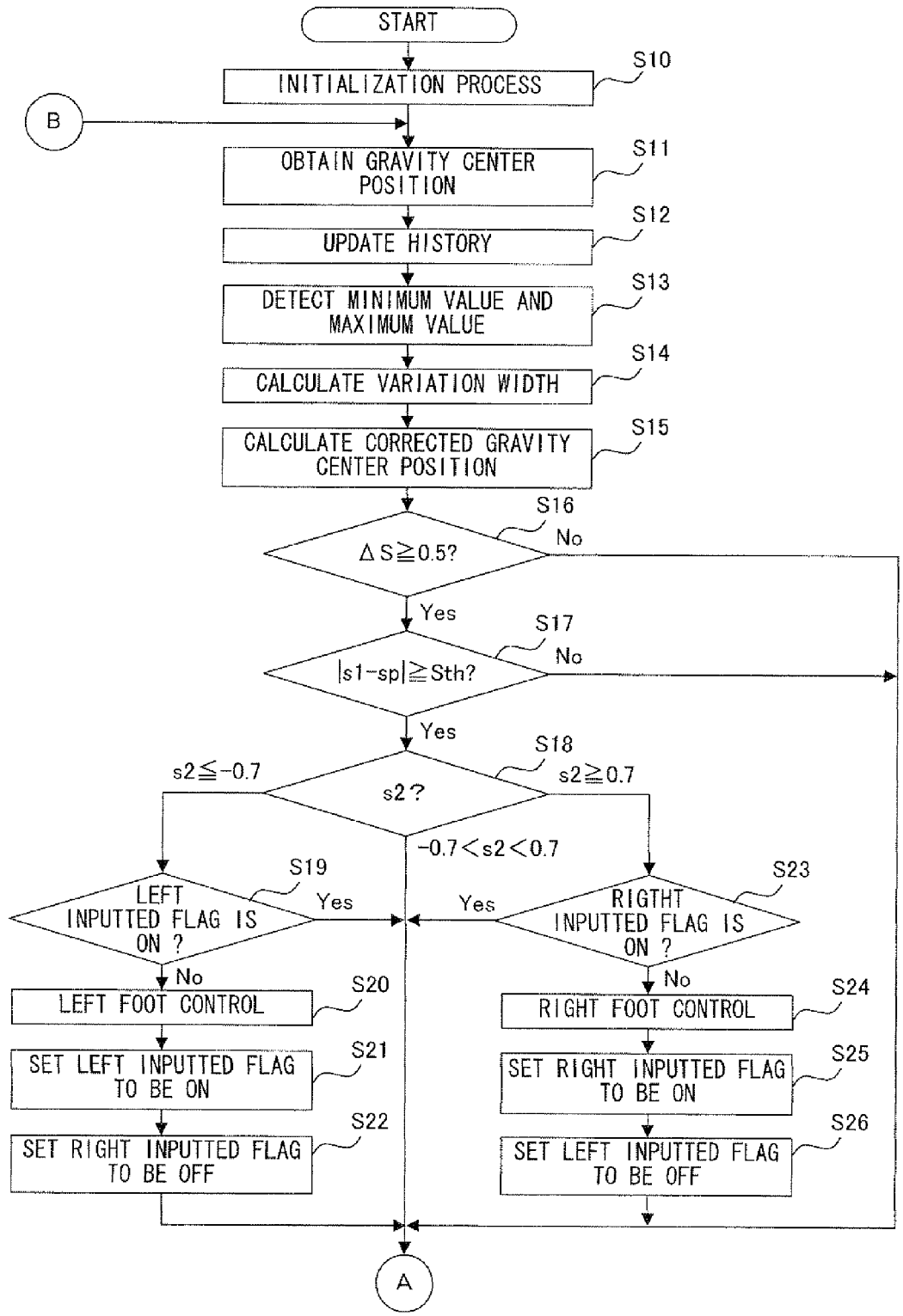
FIG. 19A is a flow chart showing a procedure of processing executed by a CPU during execution of the video game.
Figure 19B:
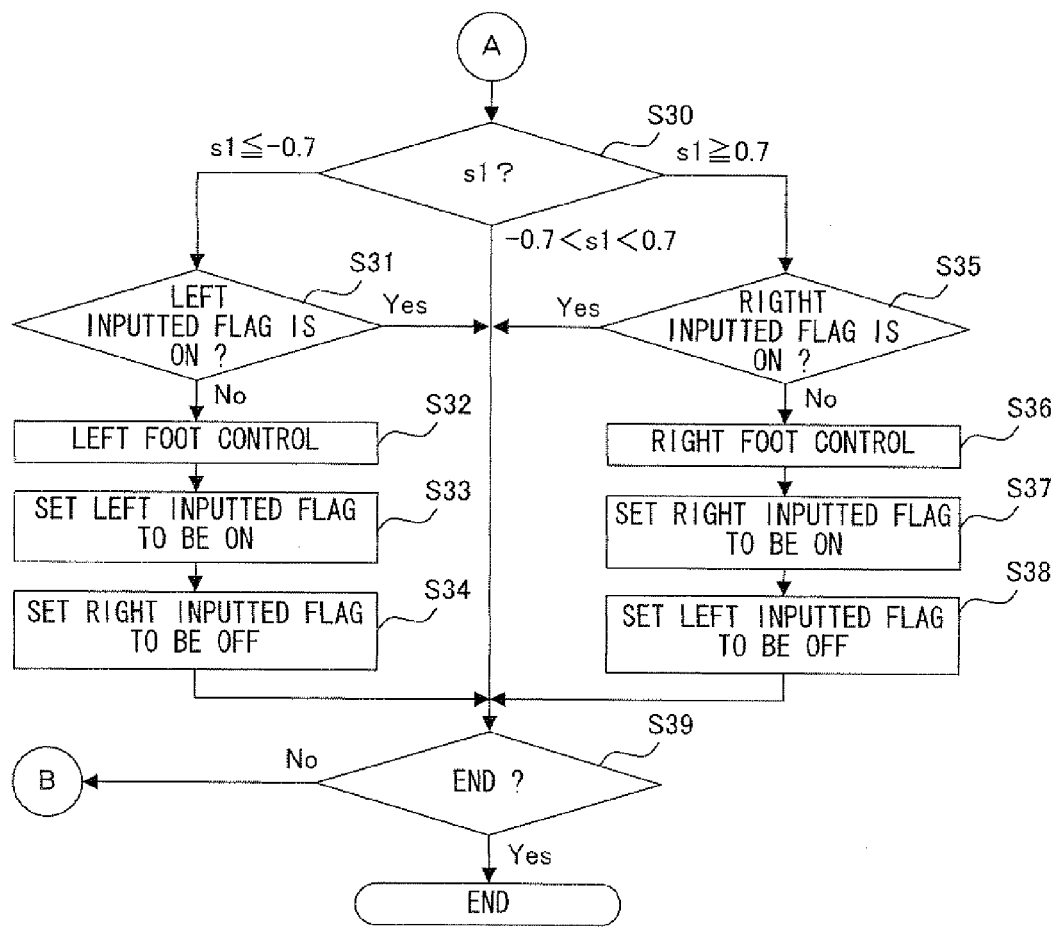
FIG. 19B is a flow chart showing the procedure of the processing executed by the CPU during execution of the video game.

With reference to the flow charts in FIGS. 19A and 19B, the following will describe a procedure of processing executed by the CPU 40 based on the information processing program 80.

When execution of the information processing program 80 is started, the CPU 40 executes an initialization process at step S10 in FIG. 19A. The initialization process includes a process of setting the right inputted flag 87 and the left inputted flag 88 to be OFF, and the like.

At step S11, the CPU 40 obtains the gravity center position of the player. Specifically, the CPU 40 calculates, based on a signal from the load controller 36, the gravity center position from load values of the four load sensors 36b that are contained in the signal, and updates the gravity center position 81 stored in the external main memory 46.

At step S12, the CPU 40 adds the gravity center position obtained at step S11 to the history 82 stored in the external main memory 46. At this time, according to need, the CPU 40 deletes a gravity center position earlier than the history period ΔT, from the history 82.

At step S13, the CPU 40 detects the minimum value Smin and the maximum value Smax among the gravity center positions stored as the history 82, and stores the minimum value Smin and the maximum value Smax as the minimum value 83 and the maximum value 84, respectively, in the external main memory 46.

At step S14, the CPU 40 calculates the variation width ΔS based on the minimum value 83 and the maximum value 84, and stores the variation width ΔS as the variation width 85 in the external main memory 46.

At step S15, the CPU 40 corrects the gravity center position 81 based on the above minimum value 83 and the above maximum value 84, to calculate a corrected gravity center position, and stores the corrected gravity center position as the corrected gravity center position 86 in the external main memory 46.

At step S16, the CPU 40 refers to the variation width 85 stored in the external main memory 46, and determines whether or not the variation width ΔS is equal to or greater than 0.5. When the variation width ΔS is equal to or greater than 0.5, the CPU 40 proceeds the processing to step S17. When the variation width ΔS is not equal to or greater than 0.5, the CPU 40 proceeds the processing to step S30 in FIG. 19B. Thus, when the variation width ΔS is not equal to or greater than 0.5, later-described processes at steps S18 to S26 (corresponding to the second input determination process) are skipped.

At step S17, the CPU 40 refers to the history 82 stored in the external main memory 46, calculates a variation amount of the gravity center position based on the latest gravity center position s1 and the last-time gravity center position sp, and determines whether or not the variation amount is equal to or greater than a predetermined variation threshold Sth. When the variation amount is equal to or greater than the variation threshold Sth, the CPU 40 proceeds the processing to step S18. When the variation amount is not equal to or greater than the variation threshold Sth, the CPU 40 proceeds the processing to step S30 in FIG. 19B. Thus, when the variation amount is not equal to or greater than the variation threshold Sth, the later-described processes at steps S18 to S26 (corresponding to the second input determination process) are skipped.

At step S18, the CPU 40 refers to the corrected gravity center position 86 stored in the external main memory 46, and determines the area (the left input area/the non-input area/the right input area) in which the corrected gravity center position s2 is located. Specifically, when s2≤−0.7, the CPU 40 determines that the corrected gravity center position s2 is located in the left input area, and proceeds the processing to step S19. When −0.7<s2<0.7, the CPU 40 determines that the corrected gravity center position s2 is located in the non-input area, and proceeds the processing to step S30 in FIG. 19B. When s2≥0.7, the CPU 40 determines that the corrected gravity center position s2 is located in the right input area, and proceeds the processing to step S23.

At step S19, the CPU 40 determines whether or not the left inputted flag 88 is ON. When the left inputted flag 88 is ON, the CPU 40 proceeds the processing to step S30 in FIG. 19B. When the left inputted flag 88 is OFF, the CPU 40 proceeds the processing to step S20. Thus, because the later-described processes at steps S20 to S22 are skipped when the left inputted flag 88 is ON (i.e., in the situation where other control for the right foot of the character is yet to be performed after control for the left foot of the character is performed), other control for the left foot of the character is not further performed just after the control for the left foot of the character is performed.

At step S20, the CPU 40 performs control for the left foot of the character (a process for stepping forward with the left foot of the character in the virtual game space). Specifically, the CPU 40 controls, in accordance with motion data that defines motion of the character, the posture of the character such that the character steps forward with the left foot. In addition, the CPU 40 controls the movement of the character by updating the position of the character in the virtual game space.

At step S21, the CPU 40 sets the left inputted flag 88 to be ON.

At step S22, the CPU 40 sets the right inputted flag 87 to be OFF.

At step S23, the CPU 40 determines whether or not the right inputted flag 87 is ON. When the right inputted flag 87 is ON, the CPU proceeds the processing to step S30 in FIG. 19B. When the right inputted flag 87 is OFF, the CPU 40 proceeds the processing to step S24. Thus, because the later-described processes at steps S24 to S26 are skipped when the right inputted flag 87 is ON (i.e., in the situation where other control for the left foot of the character is yet to be performed after control for the right foot of the character is performed), other control for the right foot of the character is not further performed just after the control for the right foot of the character is performed.

At step S24, the CPU 40 performs control for the right foot of the character (a process for stepping forward with the right foot of the character in the virtual game space). Specifically, the CPU 40 controls, in accordance with the motion data that defines the motion of the character, the posture of the character such that the character steps forward with the right foot. In addition, the CPU 40 controls the movement of the character by updating the position of the character in the virtual game space.

At step S25, the CPU 40 sets the right inputted flag 87 to be ON.

At step S26, the CPU 40 sets the left inputted flag 88 to be OFF.

Processes at steps S30 to S38 corresponds to the aforementioned first input determination process that is executed based on the gravity center position s1 (i.e., the gravity center position before correction).

At step S30, the CPU 40 refers to the gravity center position 81 stored in the external main memory 46, and determines the region (left input area/non-input area/right input area) in which the gravity center position s1 is located. Specifically, when s1≤−0.7, the CPU 40 determines that the gravity center position s1 is located in the left input area, and proceeds the processing to step S31. When −0.7<s1<0.7, the CPU 40 determines that gravity center position s1 is located in the non-input area, and proceeds the processing to step S39. When s1≥0.7, the CPU 40 determines that the gravity center position s1 is located in the right input area, and proceeds the processing to step S35.

At step S31, the CPU 40 determines whether or not the left inputted flag 88 is ON. When the left inputted flag 88 is ON, the CPU 40 proceeds the processing to step S39. When the left inputted flag 88 is OFF, the CPU 40 proceeds the processing to step S32. Thus, because the later-described processes at steps S32 to S34 are skipped when the left inputted flag 88 is ON (i.e., in the situation where other control for the right foot of the character is yet to be performed after control for the left foot of the character is performed), other control for the left foot is not further performed just after the control for the left foot of the character is performed.

At step S32, the CPU 40 performs control for the left foot of the character (the process for stepping forward with the left foot of the character in the virtual game space).

At step S33, the CPU 40 sets the left inputted flag 88 to be ON

At step S34, the CPU 40 sets the right inputted flag 87 to be OFF.

At step S35, the CPU 40 determines whether or not the right inputted flag 87 is ON. When the right inputted flag 87 is ON, the CPU 40 proceeds the processing to step S39. When the right inputted flag 87 is OFF, the CPU 40 proceeds the processing to step S36. Thud, because the later-described steps S36 to S38 are skipped when the right inputted flag 87 is ON (i.e., in the situation where other control for the left foot of the character is yet to be performed after control for the right foot of the character is performed), other control for the right foot is not further performed just after the control for the right foot of the character is performed.

At step S36, the CPU 40 performs control for the right foot of the character (the process for stepping forward with the right foot of the character in the virtual game space).

At step S37, the CPU 40 sets the right inputted flag 87 to be ON.

At step S38, the CPU 40 sets the left inputted flag 88 to be OFF.

At step S39, the CPU 40 determines whether or not the game has ended. When the game has ended, the CPU 40 ends the execution of the information processing program 80. When the game continues, the processing returns to step S11 in FIG. 19A.

By the above processing of the CPU 40, the aforementioned first input determination process and second input determination process are realized.

The flowcharts in FIGS. 19A and 19B are merely one example, and the CPU 40 may be operated according to a flow chart that is different from these flow charts, as long as the same results are obtained.

As described above, according to the above embodiment, the gravity center position is corrected based on the history of the shift of the gravity center position. Thus, even when the gravity center position shifts as shown in FIGS. 11 and 12, a stepping operation of the player can be appropriately detected, and operational feeling of the player can be improved.

Further, in the above embodiment, the linear conversion function, by which the minimum value Smin and the maximum value Smax are converted into the lower limit (−1 in this case) and the upper limit (1 in this case) of a variable range of the gravity center position, is used for the conversion from the gravity center position s1 into the corrected gravity center position s2, but the present invention is not limited thereto. For example, the gravity center position s1 may be converted into the corrected gravity center position s2 by using a linear conversion function, by which the minimum value Smin and the maximum value Smax are converted into a predetermined first fixed value (e.g., −0.9) and a predetermined second fixed value (e.g., 0.9), respectively. Alternatively, the middle position between the minimum value Smin and the maximum value Smax (i.e., (Smin+Smax)/2) may be calculated, and the result obtained by subtracting the middle position from the gravity center position s1 may be used as the corrected gravity center position s2 (i.e., the input determination process may be executed based on a relative position of the gravity center position s1 with respect to the middle position).

Figure 20:
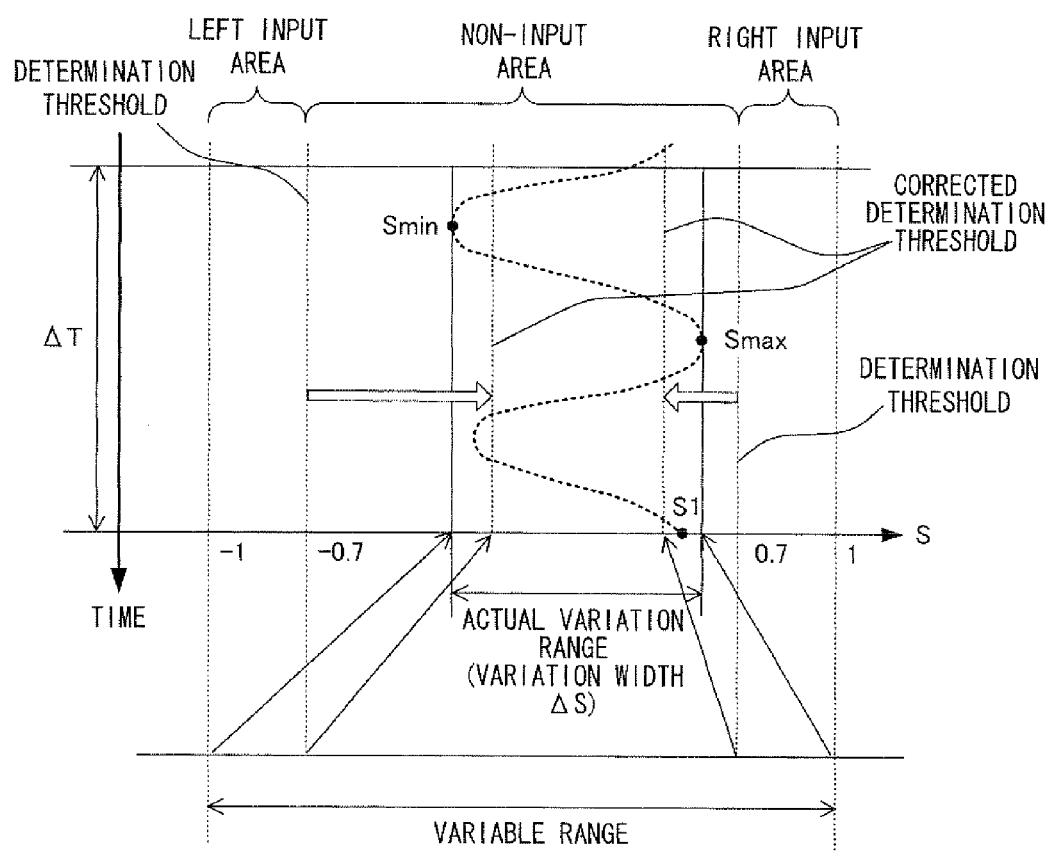
FIG. 20 is a view for explaining a modified example of the second input determination process.

Further, in the above embodiment, the gravity center position s1 is converted into the corrected gravity center position s2 based on the variation range of the gravity center position during the history period ΔT, and the corrected gravity center position s2 is compared with determination thresholds (−0.7 and 0.7) to determine whether or not the player performs a stepping operation. However, alternatively, as shown as an example in FIG. 20, the determination thresholds (−0.7 and 0.7) are converted into corrected determination thresholds based on the variation range of the gravity center position during the history period ΔT, and the gravity center position s1 is compared with the corrected determination thresholds to determine whether or not the player performs a stepping operation. By doing so, the same effects are obtained. A linear conversion function, by which the lower limit (−1 in this case) and the upper limit (1 in this case) of a variable range of the gravity center position are converted into the minimum value Smin and the maximum value Smax, can be used for the conversion from the determination thresholds into the corrected determination thresholds. A linear conversion function, by which a predetermined first fixed value (e.g., −0.9) and a predetermined second fixed value (e.g., 0.9) are converted into the minimum value Smin and the maximum value Smax, respectively, may be used for the conversion from the determination thresholds into the corrected determination thresholds.

Further, in the above embodiment, the S coordinate values (i.e., the determination thresholds) of the right boundary line SR and the left boundary line SL are −0.7 and 0.7. However, these values may be changed to any values according to need, or may be values whose absolute values are different from each other.

Further, in the above embodiment, when the variation width ΔS is less than 0.5, the second input determination process is temporarily invalidated. However, this is merely one example, and the numerical value to be compared with the variation width ΔS may be a value different from 0.5. The same is true for the other optional numerical values (thresholds)) described in the above embodiment.

Further, in the above embodiment, a time period that is equal to the 30-frame period is set as the history period ΔT, the length of the history period ΔT may be set to any other time period according to need, or may not necessarily have a fixed length. For example, the time period from start of the execution of the information processing program 80 to the current time may be the history period ΔT. In this case, all gravity center positions detected during the period from the start of the execution of the information processing program 80 to the current time may be stored as the history 82 in the external main memory 46, or the minimum value and the maximum value of the gravity center positions detected during the period from the start of the execution of the information processing program 80 to the current time may be stored as the history 82 in the external main memory 46, and these values may be updated at all times. Alternatively, for example, a local minimum value and a local maximum value of the gravity center position may be detected at all times, only the latest local minimum value and the latest local maximum value of the gravity center position may be stored as the history 82 in the external main memory 46, and these values may be updated every time a new local minimum value or a new local maximum value is detected. In this case, as shown in FIG. 21, the latest local minimum value and the latest local maximum value stored in the external main memory 46 are regarded as the above Smin and Smax, whereby the same effects as that in the above embodiment are obtained. In addition, in this case, because all the gravity center positions detected during the history period ΔT are not stored in the external main memory 46 and it is only necessary to store the latest local minimum value and the latest local maximum value in the external main memory 46, another effect that the storage area can be saved is obtained. It is noted that when a newly detected gravity center position is smaller than the latest local minimum value stored in the external main memory 46, the latest local minimum value stored in the external main memory 46 may be updated with the value of the newly detected gravity center position. Similarly, when a newly detected gravity center position is greater than the latest local maximum value stored in the external main memory 46, the latest local maximum value stored in the external main memory 46 may be updated with the value of the newly detected gravity center position.

Further, in the above embodiment, after the corrected gravity center position s2 is calculated at step S15, it is determined at steps S16 and S17 whether or not to skip the second input determination process (steps S18 to S26). However, in an alternative embodiment, the process at step S16 may be executed prior to the process at step S15. Thus, when the variation width ΔS is less than 0.5, the process at step S15 (a process of calculating a corrected gravity center position) can be omitted, and the processing burden on the CPU 40 can be reduced. Further, the process at step S17 may be executed prior to the process at step S13. Thus, when the variation amount of the gravity center position is less than the variation threshold Sth, the processes at steps S13 to S15 can be omitted, and the processing burden on the CPU 40 can be reduced.

Further, in the above embodiment, two types of input determination processes, namely, the first input determination process and the second input determination process, are executed. However, the present invention is not limited thereto, and only the second input determination process may be executed (i.e., the processes at steps S30 to S38 may not be executed). Alternatively, only while the second input determination process is temporarily invalidated (i.e., when it is determined at step S16 or S17 as NO), the processes at steps S30 to S38 may be executed.

Further, the above embodiment has described the example where control for the right foot and control for the left foot are alternately performed. However, in an alternative embodiment, either control for the right foot or control for the left foot may be consecutively performed.

Further, the above embodiment has described the example where a predetermined process (control for the right foot and control for the left foot) is executed in accordance with the magnitude relation between the gravity center position (or the corrected gravity center position) and the determination thresholds, but the present invention is not limited thereto. For example, the value of a predetermined game parameter may be changed so as to be proportional to the value (−1 to 1) of the corrected gravity center position.

Further, the above embodiment has described the example where an input determination process (the first input determination process and the second input determination process) is executed by using only the S coordinate value of the gravity center position. However, in an alternative embodiment, an input determination process may be executed by using only the T coordinate value of the gravity center position, or an input determination process may be executed for each of the S coordinate value and the T coordinate value of the gravity center position by the same method.

Further, the above embodiment has described the example where a stepping operation of the player is detected and the feet of the character in the virtual game space are controlled in accordance with the stepping operation, but the present invention is not limited thereto. For example, the present invention is applicable to a music performance application in which a piece of music is outputted in accordance with a stepping operation of the player, and to a physical fitness measurement application in which a stepping rate of the player is measured. In addition to detection of the stepping operation, the present invention is also applicable to detection of an operation of moving the gravity center in a reciprocating manner in the left-right direction or in the front-back direction, and detection of an operation of alternately pressing the load controller 36 with the right hand and the left hand.

Further, the above embodiment has described the example of using the load controller 36 that is capable of two-dimensionally detecting the gravity center position. Instead of such a load controller 36, a gravity center position detection device that is capable of one-dimensionally detecting a gravity center position (i.e., capable of detecting a gravity center position in one specific direction) may be used Further, the above embodiment has described the example where the present invention is applied to a game apparatus. However, the present invention is not limited thereto, and is applicable to any other information processing apparatuses.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium having stored thereon an information processing program that causes a computer of an information processing apparatus, which is connected to a gravity center position detection device for detecting the gravity center position of a user, to perform features comprising:

sequentially obtaining, from the gravity center position detection device, gravity center position data indicative of the gravity center position of the user;

detecting a variation range of the gravity center position of the user during a predetermined period to the current time, based on previously obtained gravity center position data; and executing a predetermined information process based on a relative position of a gravity center position, indicated by a latest obtained gravity center position data, with respect to the detected variation range.

2. The non-transitory computer-readable storage medium according to claim 1, wherein the computer is caused to perform further features comprising:
correcting the latest obtained gravity center position data in accordance with the detected variation range, and
executing the predetermined information process based on the corrected latest gravity center position data.

3. The non-transitory computer-readable storage medium according to claim 2, wherein the computer is caused to perform further features comprising correcting the latest obtained gravity center position based on a linear conversion function by which a minimum value and a maximum value of the detected variation range are converted into a predetermined first fixed value and a predetermined second fixed value, respectively.

4. The non-transitory computer-readable storage medium according to claim 3, wherein the first fixed value and the second fixed value are a lower limit and an upper limit, respectively, of obtained gravity center position data.

5. The non-transitory computer-readable storage medium according to claim 1, wherein the computer is caused to perform further features comprising:
determining whether or not the width of the detected variation range is equal to or greater than a predetermined threshold,
in the case where the width of the variation range is equal to or greater than the predetermined threshold, executing the predetermined information process when the relative position meets a predetermined condition, and
in the case where the width of the variation range is not equal to or greater than the predetermined threshold, executing the predetermined information process even when the relative position meets the predetermined condition.

6. The non-transitory computer-readable storage medium according to claim 1, wherein the computer is caused to perform further features comprising:
determining whether or not the width of the detected variation range is equal to or greater than a predetermined threshold,
in the case where the width of the variation range is equal to or greater than the predetermined threshold, executing the predetermined information process based on the relative position, and
in the case where the width of the variation range is not equal to or greater than the predetermined threshold, executing the predetermined information process based on the obtained latest gravity center position.

7. The non-transitory computer-readable storage medium according to claim 1, wherein the computer is caused to perform further features comprising:
determining whether or not a difference between the gravity center position indicated by the obtained latest gravity center position data and a gravity center position indicated by gravity center position data that is obtained immediately before the latest gravity center position data is obtained, is equal to or greater than a predetermined variation threshold,
in the case where the difference is equal to or greater than the predetermined variation threshold, executing the predetermined information process when the relative position meets a predetermined condition, and
in the case where the difference is not equal to or greater than the predetermined variation threshold, not executing the predetermined information process even when the relative position meets the predetermined condition.

8. The non-transitory computer-readable storage medium according to claim 1, wherein the computer is caused to perform further features comprising
comparing the obtained latest gravity center position with one or more predetermined determination thresholds, and
executing the predetermined information process in accordance with a result of the comparison.

9. The non-transitory computer-readable storage medium according to claim 8, wherein the computer is caused to perform further features comprising correcting the one or more predetermined determination thresholds in accordance with the detected variation range.

10. The non-transitory computer-readable storage medium according to claim 9, wherein the computer is caused to perform further features comprising correcting the one or more predetermined determination thresholds based on a linear conversion function by which a predetermined first fixed value and a predetermined second fixed value are converted into a minimum value and a maximum value, respectively, of the detected variation range.

11. The non-transitory computer-readable storage medium according to claim 10, wherein the first fixed value and the second fixed value are a lower limit and an upper limit, respectively, of obtained gravity center position data.

12. The non-transitory computer-readable storage medium according to claim 1, wherein the computer is caused to perform further features comprising:
calculating a middle position of the detected variation range, and
executing the predetermined information process based on a relative position of the gravity center position, indicated by the obtained latest gravity center position, with respect to the middle position.

13. The non-transitory computer-readable storage medium according to claim 1, wherein the computer is caused to perform further features comprising detecting, as the variation range of the gravity center position of the user, a range from a minimum value to a maximum value of gravity center position data that is obtained during a latest predetermined period.

14. The non-transitory computer-readable storage medium according to claim 1, wherein the computer is caused to perform further features comprising detecting, as the variation range of the gravity center position of the user, a range from a minimum value to a maximum value of gravity center position data that is previously obtained.

15. The non-transitory computer-readable storage medium according to claim 1, wherein the computer is caused to perform further features comprising detecting, as the variation range of the gravity center position of the user, a range from a minimum value to a maximum value of gravity center position data that is obtained during a period from start of execution of the information processing program to the current time.

16. The non-transitory computer-readable storage medium according to claim 1, wherein the computer is caused to perform further features comprising:
determining whether or not the user performs stepping based on the relative position;
performing movement control of an object in a virtual space based on a result of the determination; and generating an image of the object and displaying the image on a display screen.

17. An information processing apparatus comprising:
a memory; and
one or more processors operatively coupled to the memory and configured to perform features comprising:
sequentially obtaining, from a gravity center position detection device for detecting the gravity center position of a user, gravity center position data indicative of the gravity center position of the user,
detecting a variation range of the gravity center position of the user during a predetermined period to the current time, based on previously obtained gravity center position data; and
executing a predetermined information process based on a relative position of a gravity center position, indicated by a latest obtained gravity center position data, with respect to the detected variation range.

18. An information processing system, comprising:
a gravity center position detection device for detecting the gravity center position of a user; and
an information processing apparatus operatively coupled to the gravity center position detection device and having one or more processors configured to perform features comprising:
sequentially obtaining, from the gravity center position detection device, gravity center position data indicative of the gravity center position of the user,
detecting a variation range of the gravity center position of the user during a predetermined period to the current time, based on previously obtained gravity center position data, and
executing a predetermined information process based on a relative position of a gravity center position, indicated by a latest obtained gravity center position data, with respect to the detected variation range.

19. A method implemented using an information processing apparatus having one or more processors, and which is operatively associated with a gravity center position detection device for detecting the gravity center position of a user, the method comprising:
sequentially obtaining, from the gravity center position detection device, gravity center position data indicative of the gravity center position of the user;
detecting, via the one or more processors, a variation range of the gravity center position of the user during a predetermined period to the current time, based on previously obtained gravity center position data; and
executing a predetermined information process based on a relative position of a gravity center position, indicated by a latest obtained gravity center position data, with respect to the detected variation range.

* * * * *